(12) United States Patent
Do et al.

(10) Patent No.: US 11,898,631 B2
(45) Date of Patent: Feb. 13, 2024

(54) TRANSMISSION FOR VEHICLE

(71) Applicant: SL Corporation, Daegu (KR)

(72) Inventors: Mi Rae Do, Gyeongsan-si (KR); Sung Jin Kim, Gyeongsan-si (KR); Min Soo Kim, Gyeongsan-si (KR); Jae Seung Hong, Gyeongsan-si (KR); Gwang Sun Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/564,910

(22) Filed: Dec. 29, 2021

(65) Prior Publication Data

US 2022/0205532 A1 Jun. 30, 2022

(30) Foreign Application Priority Data

Dec. 31, 2020 (KR) .................. 10-2020-0190008

(51) Int. Cl.
*F16H 59/08* (2006.01)
*F16H 59/10* (2006.01)
*H02K 7/10* (2006.01)
*H02K 1/27* (2022.01)

(52) U.S. Cl.
CPC .............. *F16H 59/08* (2013.01); *F16H 59/10* (2013.01); *H02K 1/27* (2013.01); *H02K 7/1004* (2013.01)

(58) Field of Classification Search
CPC ...... H02K 7/116; H02K 49/102; F16H 59/08; F16H 59/10; F16H 61/16
See application file for complete search history.

(56) References Cited

U.S. PATENT DOCUMENTS

| | | | | |
|---|---|---|---|---|
| 6,564,661 B2* | 5/2003 | DeJonge | ................ | F16H 59/08 74/335 |
| 9,835,245 B2* | 12/2017 | Lee | ................ | F16H 61/24 |
| 2018/0372216 A1* | 12/2018 | Yamanaka | ............ | B60K 20/02 |
| 2019/0203832 A1* | 7/2019 | Heo | ................ | F16H 61/24 |
| 2020/0208738 A1* | 7/2020 | Kim | ................ | F16H 55/17 |

* cited by examiner

*Primary Examiner* — Gregory Robert Weber
(74) *Attorney, Agent, or Firm* — United One Law Group LLC; Kongsik Kim; Jhongwoo Peck

(57) ABSTRACT

A transmission for a vehicle includes a transmission unit for receiving a transmission command for a vehicle, a driving unit for generating a driving force for switching a posture of the transmission unit, and a control device for controlling the driving unit to switch the posture of the transmission unit based on whether a preset condition is satisfied. The driving unit includes a first stator for generating magnetic flux, a first rotor having a first inner permanent magnet and a second inner permanent magnet axially arranged at a predetermined spacing along a rotation axis, and configured to be rotated by the magnetic flux transferred to the first inner permanent magnet, an outer permanent magnet, and a second rotor configured to rotate along a magnetic force path between the second inner permanent magnet and the outer permanent magnet.

20 Claims, 28 Drawing Sheets

FIG. 17

| Fixed | Input | Output | Ratio |
|---|---|---|---|
| Outer rotor ($p_1$) | Inner rotor ($p_2$) | Pole piece ($n_s = p_1 + p_2$) | $\frac{p_1}{p_2} + 1$ |
| Pole piece ($n_s = p_1 + p_2$) | Inner rotor ($p_2$) | Outer rotor ($p_1$) | $\frac{p_1}{p_2}$ |
| Inner rotor ($p_2$) | Outer rotor ($p_1$) | Pole piece ($n_s = p_1 + p_2$) | $\frac{p_2}{p_1} + 1$ |

TRANSMISSION FOR VEHICLE

CROSS-REFERENCE TO RELATED APPLICATION

This application claims priority to Korean Patent Application No. 10-2020-0190008, filed on Dec. 31, 2020, which is incorporated herein by reference in its entirety.

BACKGROUND

1. Technical Field

The present disclosure relates to a transmission for a vehicle, and more particularly, to a transmission for a vehicle, in which a posture of a transmission unit is switched based on a preset condition.

2. Description of the Related Art

The transmission may change the gear ratio to allow the engine's rotational speed to be adjusted independent of the speed of the vehicle, and the driver operates the transmission lever to change the gear ratio of the transmission.

Transmission modes include a manual transmission mode, in which the driver can change a gear stage, and an automatic transmission mode, in which the gear stage is autonomously changed based on the vehicle speed upon the driver selecting the driving stage D.

Additionally, there is also a sports mode type transmission, which is capable of performing manual transmission and automatic transmission in one transmission. In the sports mode type transmission, a transmission capable of performing a manual transmission may be provided along with an automatic transmission so that the driver can perform manual transmission by shifting up or down the gear stage while primarily performing automatic transmission.

The transmission lever is exposed inside the vehicle to allow the driver to operate it, and most transmission levers are exposed between the center fascia and the console box of the vehicle.

In general, since a driver selects a transmission stage by moving a transmission lever, a space is required for the movement trajectory of the transmission lever, so it is required to be designed to prevent interference with the surroundings.

Accordingly, in recent years, a dial-type or button-type transmission control is being used to reduce the space required for the transmission control, thereby allowing the interior space of the vehicle to be utilized more efficiently and improving the transmission operation.

SUMMARY

An object of the present disclosure is to provide a transmission for a vehicle, in which a posture of a transmission unit is switched according to a preset condition.

In order to achieve the above object, a transmission for a vehicle according to an exemplary embodiment of the present disclosure may include a transmission unit for receiving a transmission command for a vehicle, a driving unit for generating a driving force for switching a posture of the transmission unit, and a control device for controlling the driving unit to switch the posture of the transmission unit based on whether a preset condition is satisfied. In particular, the driving unit may include a first stator for generating magnetic flux, a first rotor including a first inner permanent magnet and a second inner permanent magnet axially arranged at a predetermined spacing along a rotation axis, and configured to be rotated by the magnetic flux transferred to the first inner permanent magnet, an outer permanent magnet provided in a number different from that of the second inner permanent magnet, and a second rotor configured to rotate along a magnetic force path between the second inner permanent magnet and the outer permanent magnet at a number of revolutions per unit time that is different from a number of revolutions per unit time of the first rotor.

The control device may be configured to control the driving unit to cause the transmission unit to be switched to a parking position in response to a parking condition being satisfied. The control device may be configured to control the driving unit to cause the transmission unit to be switched to a stow position in response to a stow condition being satisfied.

Further, in response to the transmission unit being switched from a position corresponding to a first transmission stage to a position corresponding to a second transmission stage while a transmission condition is not satisfied, the control device may be configured to control the driving unit to cause the transmission unit to be switched to the position corresponding to the first transmission stage.

In addition, the second rotor may include a base, and a plurality of pole pieces, each of which extends in one direction from an edge of the base. The plurality of pole pieces may be arranged between the second inner permanent magnet and the outer permanent magnet, and may form the magnetic force path between the second inner permanent magnet and the outer permanent magnet.

The second rotor may rotate in a stepwise manner in response to a force greater than a magnetic force between the second inner permanent magnet and the outer permanent magnet being exerted on the second rotor. The second rotor may rotate in a stepwise manner with an articulation having a distance between adjacent pole pieces or a distance between adjacent outer permanent magnets.

The second rotor may rotate in a stepwise manner to generate a sense of operation in the transmission unit in response to a force greater than a magnetic force between the second inner permanent magnet and the outer permanent magnet being exerted on the second rotor.

The transmission unit and the driving unit may exchange forces with each other via a driving force transferring unit. In some embodiments, the driving force transferring unit may include a belt.

In some embodiments, the driving force transferring unit may include a wire, a driving pulley rotatable by a driving force of the driving unit, wherein the wire is wound around an outer circumferential surface of the driving pulley, and a driven pulley rotatable by switching the posture of the transmission unit. Accordingly, a rotational force may be exchanged between the driving pulley and the driven pulley via the wire.

The driving force transferring unit may further include a wire fixing unit for fixing the wire to the driven pulley, and a tension of the wire may be adjustable depending on a coupling depth of the wire fixing unit into the driven pulley.

The wire fixing unit can include a hollow lumen therein, through which the wire passes, a wire fixing pin may be fixedly coupled to the wire at an end of the wire that passes through the hollow lumen, and the wire fixing unit may be coupled to the driven pulley while pressing the wire fixing pin.

Further, a portion of the wire wound on the driving pulley may include a slip preventing pin fixedly coupled to the wire, and the driving pulley may include a receiving groove for accommodating the slip preventing pin therein.

In some other embodiments, the transmission unit and the driving unit may be directly coupled to each other to exchange power. In some such embodiments, the transmission unit may be directly coupled to a spindle of the driving unit.

According to the transmission for a vehicle according to exemplary embodiments of the present disclosure as described above, due to the use of a non-contact type driving unit, the noise due to rotation may be reduced, the user's operation feeling may be improved, and no separate parts are required to implement the automatic Return to Park (RTP) function.

BRIEF DESCRIPTION OF THE DRAWINGS

These and/or other aspects will become apparent and more readily appreciated from the following description of the exemplary embodiments, taken in conjunction with the accompanying drawings in which:

FIGS. 16 to 18 describe the rotation operation of the second rotor according to an exemplary embodiment of the present disclosure;

DETAILED DESCRIPTION

Figure 1:
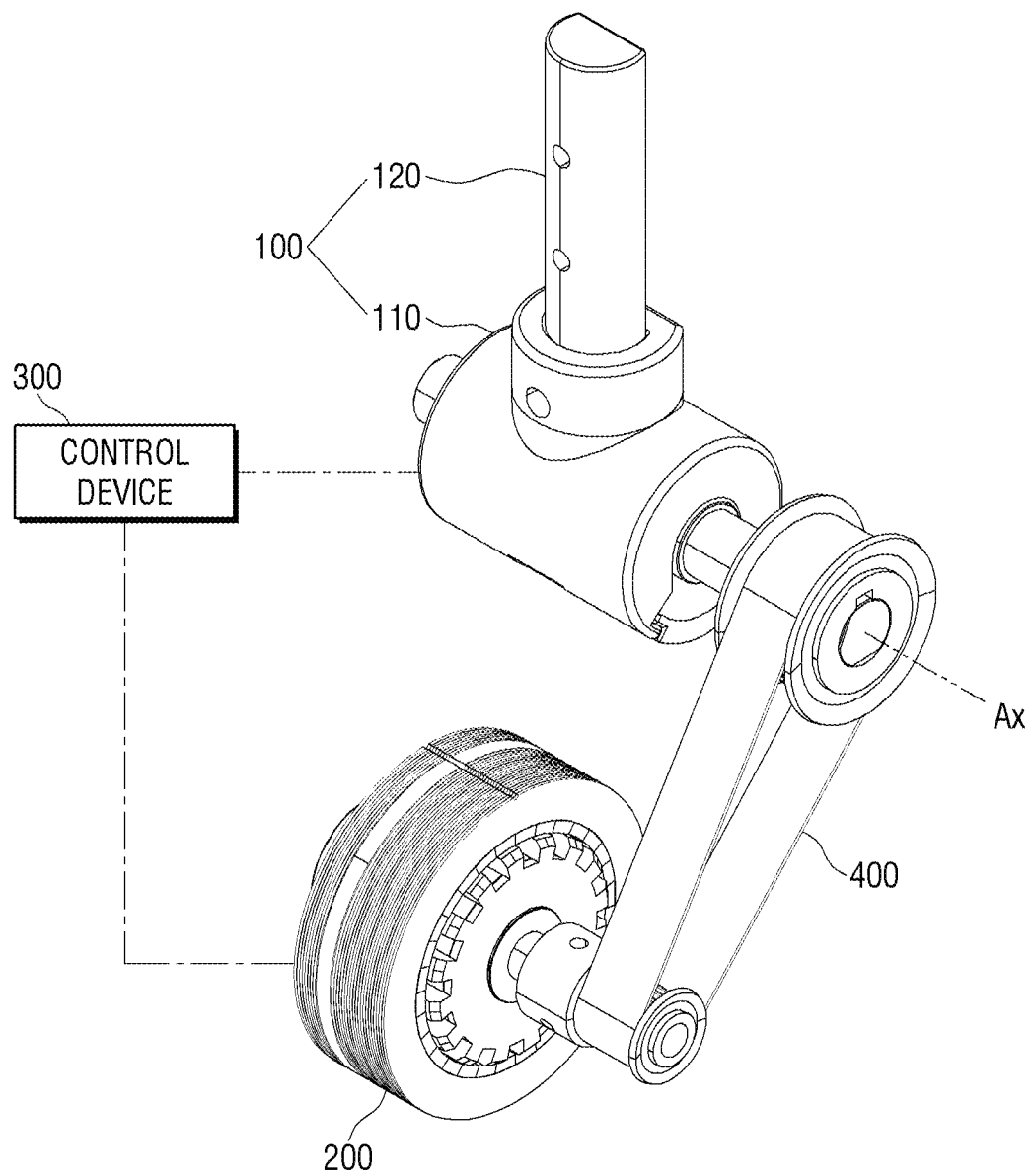
FIG. 1 illustrates a transmission for a vehicle according to an exemplary embodiment of the present disclosure.

Hereinafter, preferred embodiments of the present disclosure will be described in detail with reference to the accompanying drawings. Advantages and features of the present disclosure, and a method of achieving them will be apparent with reference to exemplary embodiments described below in detail together with the accompanying drawings. However, the present disclosure is not limited to the exemplary embodiments to be described below, but may be implemented in various different forms, and these exemplary embodiments are only provided to make the disclosures of the present disclosure complete, and to fully inform the scope of the disclosure to those of ordinary skill in the technical field to which the present disclosure belongs. Further, the disclosure is only defined by the scope of the claims. The same reference numerals refer to the same components throughout the specification.

Unless otherwise defined, all terms (including technical and scientific terms) used in the present specification may be used as meanings that can be commonly understood by those of ordinary skill in the art to which the present disclosure belongs. In addition, unless explicitly and specifically defined otherwise, terms defined in a commonly used dictionary should not be interpreted too ideally or excessively.

Figure 2:
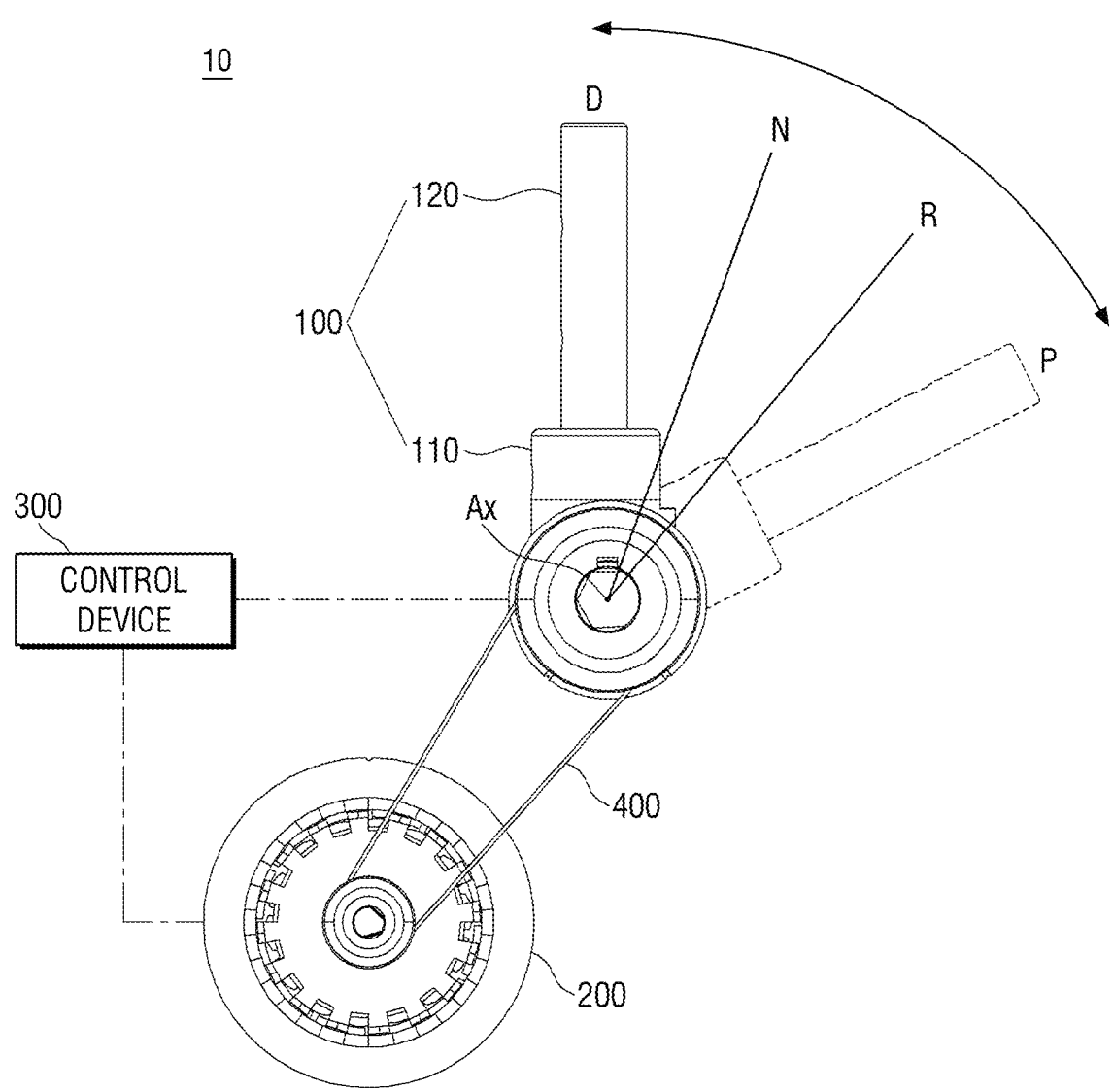
FIGS. 2 and 3 illustrate operation of the transmission for a vehicle illustrated in FIG. 1.
Figure 3:
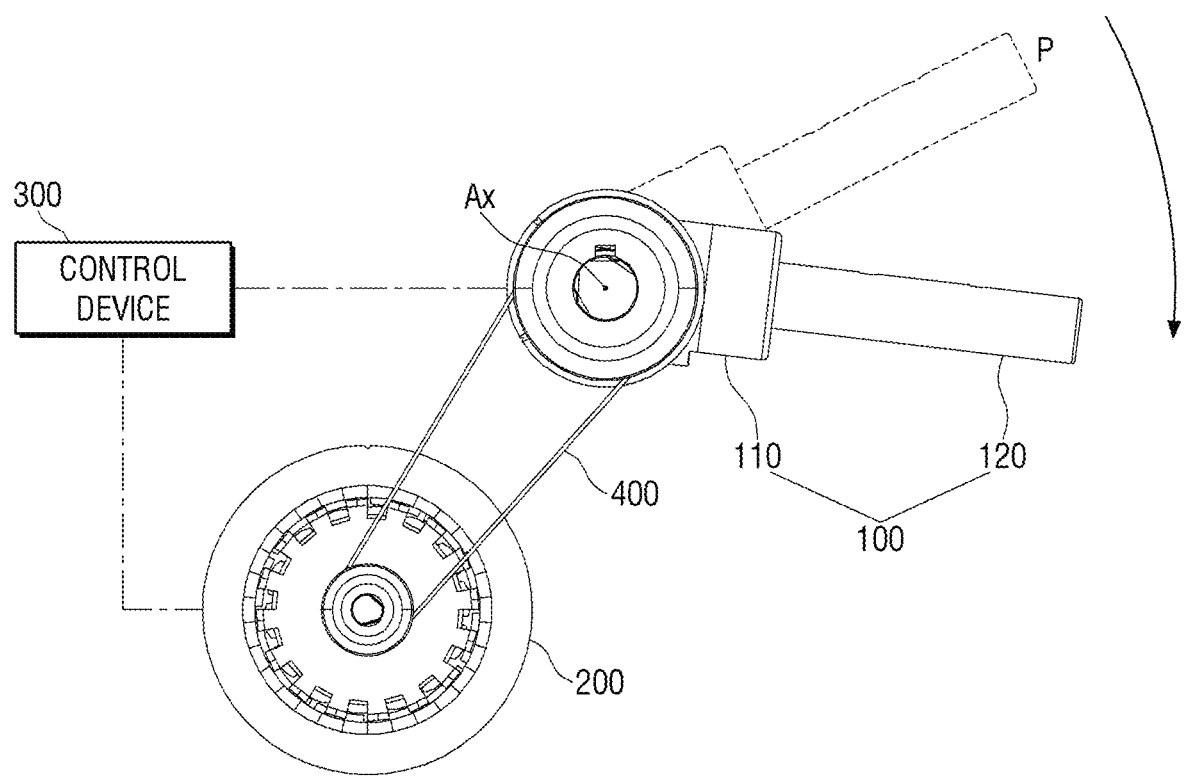

FIG. 1 illustrates a transmission for a vehicle according to an exemplary embodiment of the present disclosure, and FIGS. 2 and 3 depict the operation of the transmission for a vehicle illustrated in FIG. 1.

Referring to FIG. 1, a transmission for a vehicle 10 according to an exemplary embodiment of the present disclosure may include a transmission unit 100, a driving unit 200, and a control device (e.g., a controller) 300.

The transmission unit 100 may receive a transmission command input for the vehicle. The transmission unit 100 may include a transmission body 110 and a transmission lever 120. The transmission body 110 may rotate with respect to the rotation axis Ax. The transmission lever 120 may be elongated in one direction from the transmission body 110. For example, the transmission lever 120 may be elongated in a direction perpendicular to the rotation axis Ax. As the transmission body 110 rotates, the longitudinal direction of the transmission lever 120 may be switched (e.g., adjusted or tilted). The driver may operate the transmission unit 100 to adjust the transmission stage of the vehicle. In the present disclosure, the available transmission stage may include a parking stage (P stage), a reverse stage (R stage), a neutral stage (N stage), and a driving stage (D stage).

The driving unit 200 may generate a driving force for adjusting the posture of the transmission unit 100. For example, the driving unit 200 may generate a rotational force, and the posture of the transmission unit 100 may be adjusted due to the transmission unit 100 being rotated by the rotational force.

Referring to FIG. 2, when the driving force of the driving unit 200 is transferred to the transmission unit 100, the posture of the transmission unit 100 may be set to the parking stage (P stage), the reverse stage (R stage), the neutral stage (N stage) or the driving stage (D stage). In addition, the transmission 10 for a vehicle according to an exemplary embodiment of the present disclosure may include a stow position. By way of example, referring to FIG. 3, the transmission unit 100 may be switched from the parking position to the stow position. In the stow position, the transmission lever 120 of the transmission unit 100 may be laid parallel to the ground or arranged similarly thereto. In the stow position, the transmission stage of the transmission unit 100 may be maintained at the parking stage. Although not shown, a separate storage device (not shown) for accommodating the transmission lever 120 of the transmission unit 100 may be provided. In this case, the transmission lever may be accommodated in the storage device in the stow position, whereas the transmission lever 120 may be exposed out of the storage device in the non-stow positions.

The driving force of the driving unit 200 may be transferred to the transmission unit 100 by a driving force transferring unit 400. The driving force transferring unit 400 may include a belt. The driving force transferring unit 400 may transfer a rotational force to the driving unit 200 based on the posture switch of the transmission unit 100. Accordingly, the transmission unit 100 and the driving unit 200 may transmit power with each other through the driving force transferring unit 400.

The control device 300 may be configured to control the driving unit 200 so that the posture of the transmission unit 100 is switched based on whether a preset condition is satisfied. Specifically, when the parking condition is satisfied, the control device 300 may control the driving unit 200 to cause the transmission unit 100 to be switched to the parking stage position. For example, when the ignition of the vehicle is turned off or turned on, the control device 300 may control the driving unit 200 to cause the transmission unit 100 to be switched to the parking position. Alternatively, when the stow condition is satisfied, the control device 300 may control the driving unit 200 to cause the transmission unit 100 to be switched to the stow position. For example, when the ignition of the vehicle is turned off or a separate user command is input by using an input means such as a button, the control device 300 may control the driving unit 200 to cause the transmission unit 100 to be switched to the stow position. On the other hand, when the condition is not satisfied but the transmission unit 100 is nevertheless switched from the position of a first transmission stage to the position of a second transmission stage, the control device 300 may control the driving unit 200 to cause the transmission unit 100 to be switched back to the position of the first transmission stage. For example, the transmission unit 100 may be switched from the driving stage to the neutral stage by mistake of a user. In this case, the control device 300 may determine whether the switch of position was intentional or inadvertent. In response to determining that it was inadvertent, the control device 300 may control the driving unit 200 to cause the transmission unit 100 to be switched to the driving stage 200.

Figure 4:
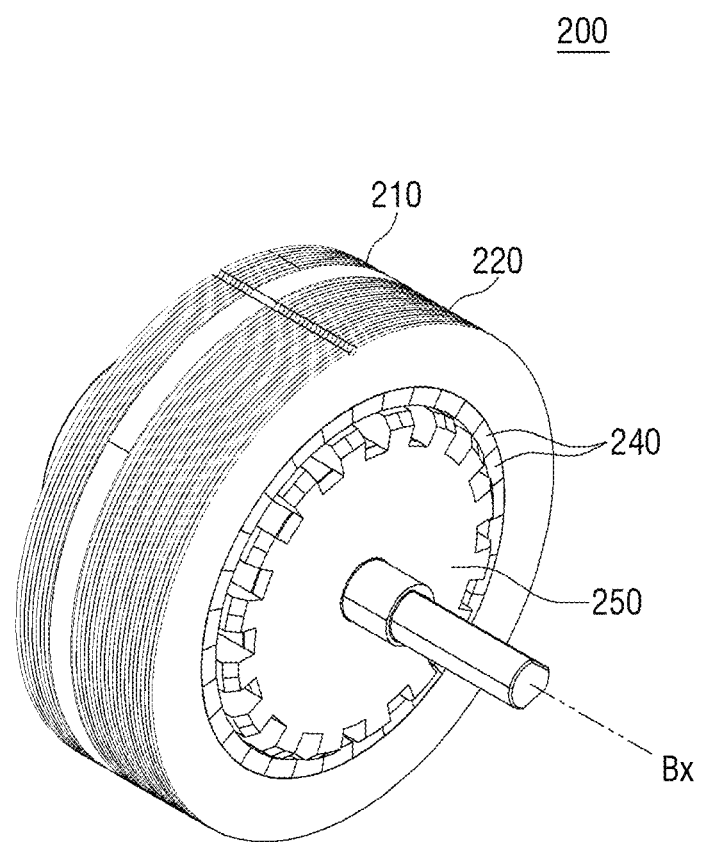
FIGS. 4 to 6 show a driving unit according to an exemplary embodiment of the present disclosure.
Figure 5:
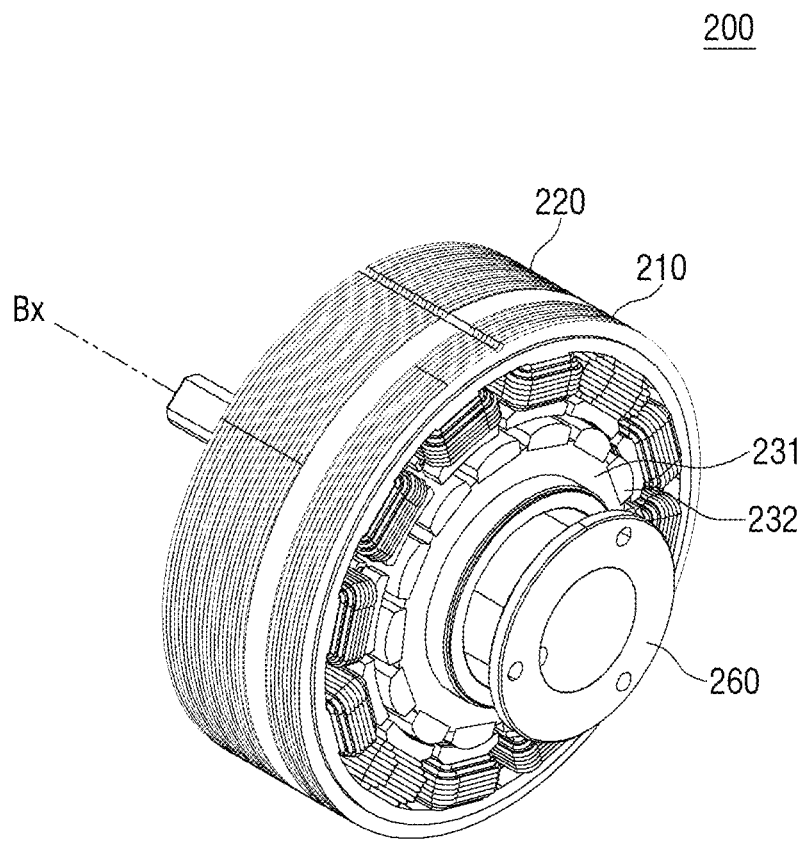
Figure 6:
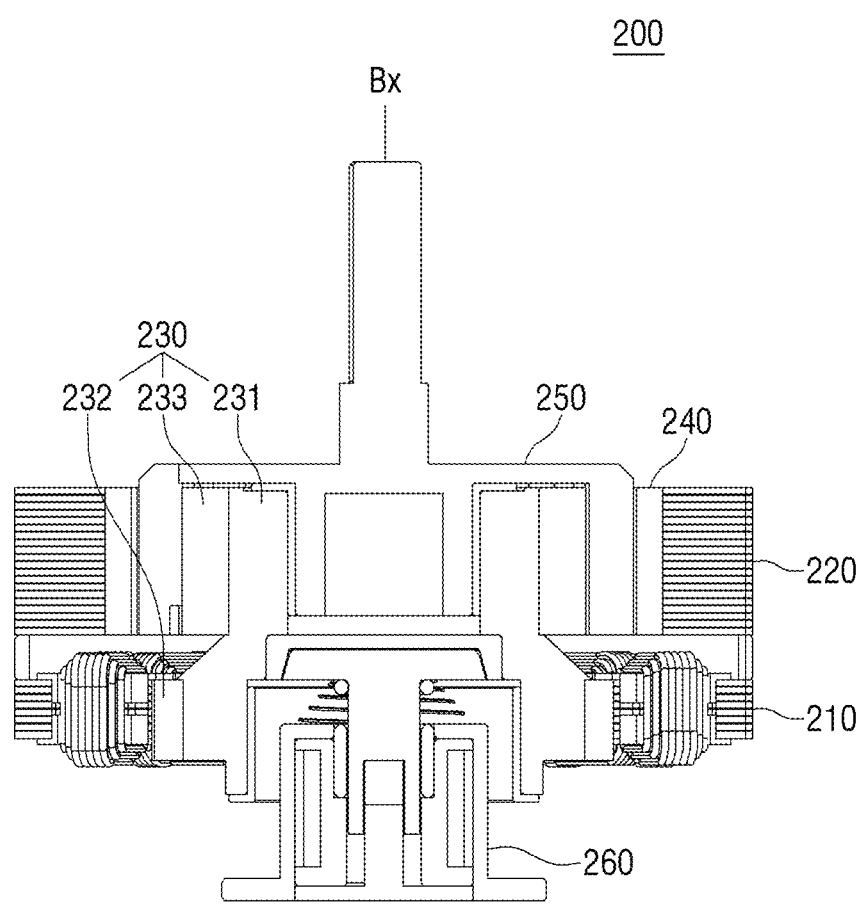

FIGS. 4 to 6 illustrate a driving unit according to an exemplary embodiment of the present disclosure. Referring to FIGS. 4 to 6, the driving unit 200 may include a first stator 210, a second stator 220, a first rotor 230, an outer permanent magnet 240, a second rotor 250, and a rotation preventing unit 260.

The first stator 210 may generate magnetic flux. The first stator 210 may include a plurality of coils provided separately from one another. Specifically, the first stator 210 may include a plurality of coils connected in three phases to generate magnetic flux by receiving power with time differences. Power may be sequentially supplied to a plurality of coils connected in three phases, and the coils receiving the power may generate magnetic flux. A detailed description of the first stator 210 will be described later below with reference to FIGS. 7 and 8.

The second stator 220 may support the outer permanent magnet 240. The first stator 210 and the second stator 220 may be arranged adjacently along the rotation axis Bx. In the present disclosure, the rotation axis Bx may be a rotation axis of the first rotor 230 or the second rotor 250.

The first rotor 230 may include a rotating body 231, a first inner permanent magnet 232, and a second inner permanent magnet 233. The first rotor 230 may be rotated by the magnetic flux transmitted from the first stator 210. A detailed description of the first rotor 230 will be described later below with reference to FIGS. 10 to 12.

A plurality of outer permanent magnets 240 may be arranged in the form of a ring outside the first rotor 230. Specifically, the outer permanent magnet 240 may be arranged concentrically with the second inner permanent magnet 233 at the point of the rotation axis Bx where the second inner permanent magnet 233 is disposed. The number of the outer permanent magnets 240 may be different from the number of the second inner permanent magnets 233. Specifically, the number of the outer permanent magnets 240 may be greater than the number of the second inner permanent magnets 233.

The second rotor 250 may rotate along a magnetic force path between the second inner permanent magnet 233 and the outer permanent magnet 240. In this case, the second rotor 250 may rotate at a number of revolutions per unit time (e.g., RPM or a rotational speed) different from the number of revolutions per unit time of the first rotor 230. The second rotor 250 may include a plurality of pole pieces 252 (see FIG. 13). As the pole pieces 252 form a magnetic force path between the second inner permanent magnet 233 and the outer permanent magnet 240, the second rotor 250 may be rotated. In particular, the number of revolutions per unit time of the second rotor 250 with respect to the number of revolutions per unit time of the first rotor 230 may be determined by the number of first inner permanent magnets 232, the number of second inner permanent magnets 233, and the number of pole pieces 252. As described above, the number of the outer permanent magnets 240 may be greater than the number of the second inner permanent magnets 233. In this case, the number of revolutions per unit time of the second rotor 250 may be smaller than the number of revolutions per unit time of the first rotor 230.

The rotation prevention unit 260 may prevent rotation of the first rotor 230 by applying a physical force to the first rotor 230 when a preset condition is satisfied. A detailed description of the operation of the rotation preventing unit 260 will be described later below with reference to FIG. 19.

Hereinafter, a detailed configuration and operation of each element of the driving unit 200 will be described with reference to FIGS. 7 to 20.

Figure 7:
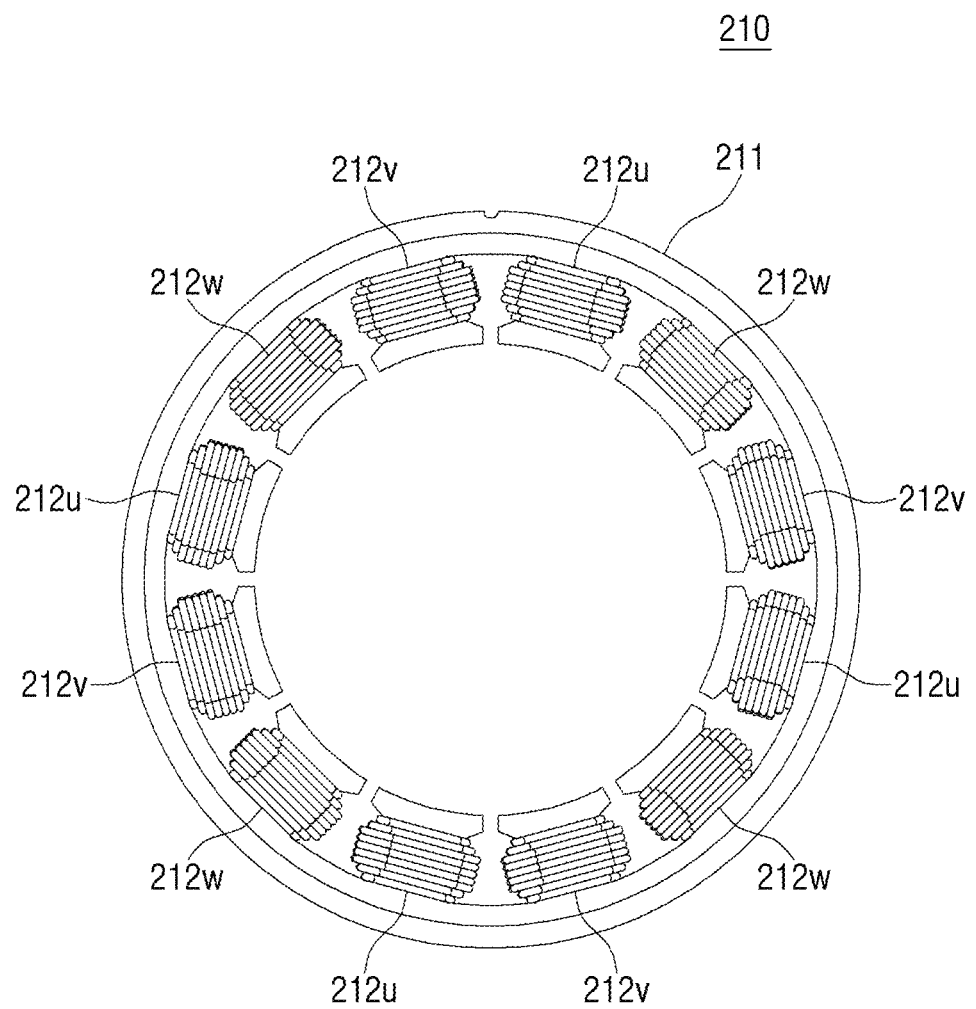
FIG. 7 shows a first stator according to an exemplary embodiment of the present disclosure.
Figure 8:
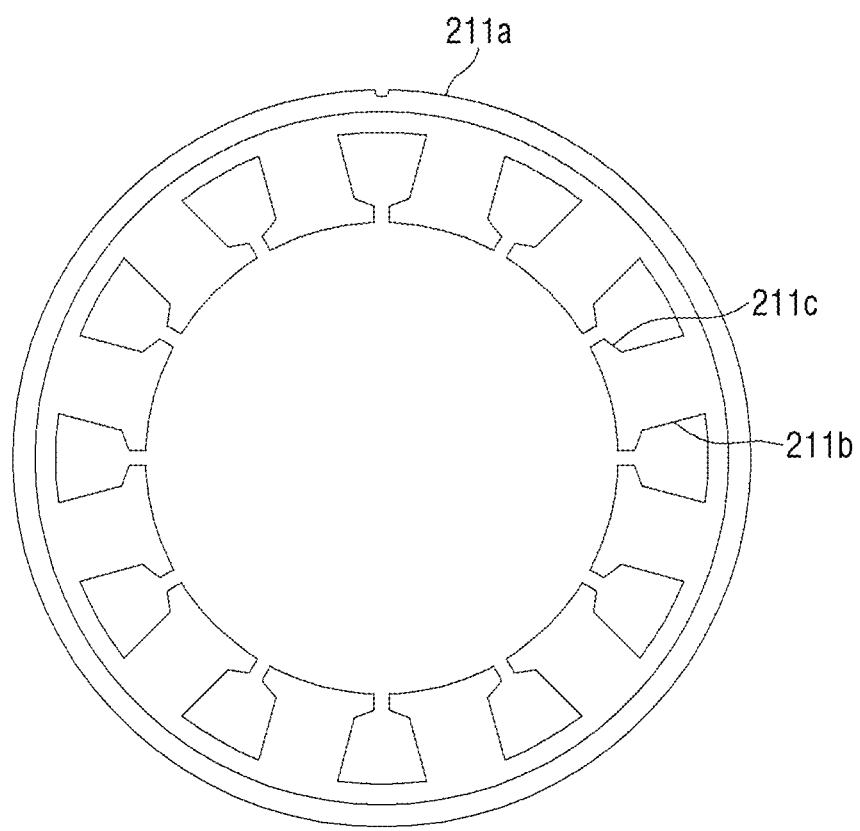
FIG. 8 shows a fixed body of the first stator according to an exemplary embodiment of the present disclosure.
Figure 9:
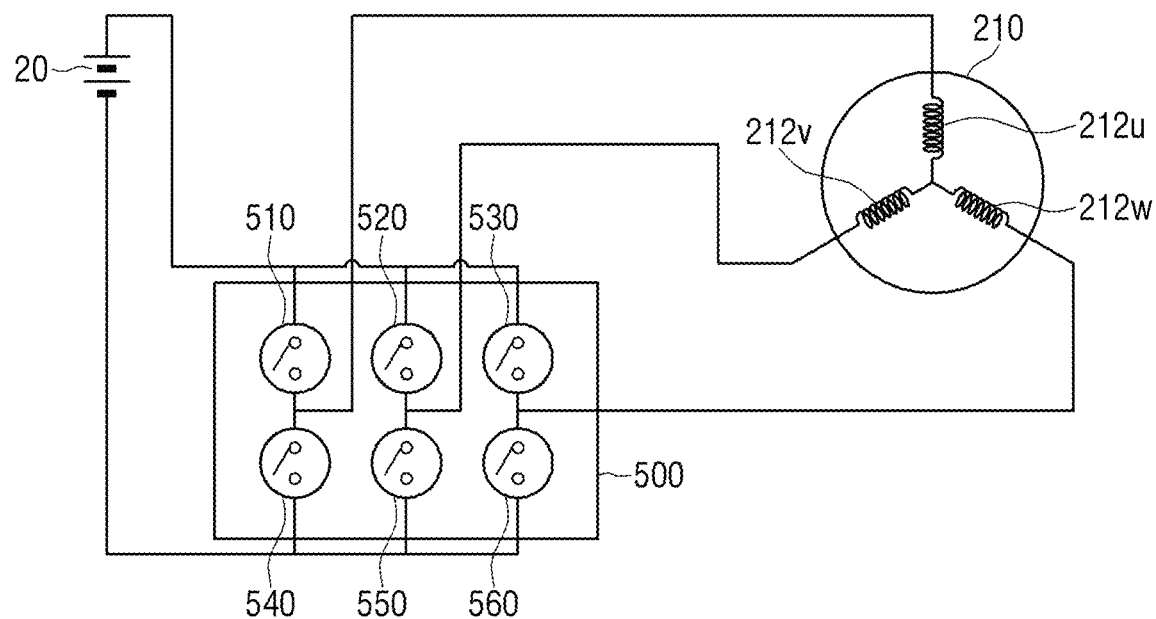
FIG. 9 schematically depicts the operation principle of the first stator according to an exemplary embodiment of the present disclosure.

FIG. 7 shows a first stator, FIG. 8 shows a fixed body of the first stator, and FIG. 9 schematically depicts an operation principle of the first stator. Referring to FIGS. 7 and 8, the first stator 210 may include a fixed body 211 and coils 212u, 212v, and 212w. The fixed body 211 may include a rim 211a, one or more legs 211b, and one or more teeth 211c. The rim 211a may be provided in the form of a ring. A plurality of legs 211b may protrude toward an inner direction of the rim 211a. Coils 212u, 212v, and 212w may be wound around the leg 211b. The length of the leg 211b protruding from the rim 211a may be formed to have a predetermined minimum length.

Teeth 211c may be provided at the end of each of the plurality of legs 211b. The teeth 211c may prevent the coils 212u, 212v, and 212w wound around the leg 211b from separating therefrom. Also, the teeth 211c may form a magnetic flux path of magnetic flux generated from the coils 212u, 212v, and 212w.

By way of example, twelve (12) legs 211b may be provided. The 12 legs 211b may be arranged on the rim 211a so that the spacing between the adjacent legs 211b is substantially uniform. FIG. 7 illustrates that the U-phase coil 212u, the V-phase coil 212v, and the W-phase coil 212w may be installed in the fixed body 211. The U-phase coil 212u, the V-phase coil 212v, and the W-phase coil 212w may be sequentially wound around the leg 211b in a clockwise or counterclockwise direction. The coils 212u, 212v, and 212w of the same phase may be electrically connected to one another. FIG. 7 shows that four U-phase coils 212u, V-phase coils 212v, and W-phase coils 212w are provided, respectively, and the four U-phase coils 212u may be electrically connected to one another, four V-phase coils 212v may be electrically connected to one another, and four W-phase coils 212w may be electrically connected to one another. Therefore, when power is supplied to one of the four U-phase coils 212u, power may also be supplied to the other three U-phase coils 212u. Such power supply method may also be applied to the V-phase coils 212v and W-phase coils 212w.

Among the plurality of coils connected in three phases, it can be understood that the first-phase coil corresponds to the U-phase coil 212u, the second-phase coil corresponds to the V-phase coil 212v, and the third-phase coil corresponds to the W-phase coil 212w.

Although it has been described above that the number of the legs 211b is 12, in some embodiments of the present disclosure, the number of the legs 211b may be less than 12 or more than 12. Hereinafter, it will be mainly described focusing on an example where the number of the legs 211b is 12.

FIG. 9 schematically describes the operation principle of the first stator. Referring to FIG. 9, the first stator 210 may be connected to a vehicle power source 20 through a switching unit 500. The vehicle power source 20 may includes a battery provided in the vehicle, but the vehicle power source 20 of the present disclosure is not limited to the battery.

The switching unit 500 may include a plurality of switches 510-560. In some embodiments, six switches 510-560 may be provided. The plurality of switches 510-560 may include first to third switch groups connected in parallel. The first switch group may include a first switch 510 and a fourth switch 540 connected in series, the second switch group may include a second switch 520 and a fifth switch 550 connected in series, and the third switch group may include a third switch 530 and a sixth switch 560 connected in series.

Connection portions of the first switch 510 and the fourth switch 540 may be connected to a first-phase coil, that is, the U-phase coil 212u among a plurality of three-phase connected coils. Similarly, the connection portions of the second switch 520 and the fifth switch 550 may be connected to a second-phase coil, that is, the V-phase coil 212v among a plurality of three-phase connected coils, and the connection portions of the third switch 530 and the sixth switch 560 may be connected to a third-phase coil, that is, the W-phase coil 212w among a plurality of three-phase connected coils.

The operation of each of the six switches 510-560 may be controlled by the control device 300. The control device 300 may individually control the opening and closing of the six switches 510-560. Whether to supply power of the vehicle power source 20 to each of the coils 212u, 212v, and 212w provided in the first stator 210 may be determined by individual operations of the switches 510-560. For example, power may be supplied to a selected coil among the U-phase coil 212u, the V-phase coil 212v, and the W-phase coil 212w by the operation of the switches 510-560.

The sequential supply of power may be performed pair by pair. In other words, a pair of coils may be established as a power supply circuit, by the operation of the switches 510-560, and power may be supplied to the pair of coils included in the corresponding circuit. Each of the pair of coils can generate magnetic flux of different polarity. For example, one of the pair may generate an N-pole magnetic flux, and the other of the pair may generate an S-pole magnetic flux. As such, one of the pair of coils may apply a repulsive force to the first rotor 230, and the other of the pair may apply an attraction force to the first rotor 230.

The coil pairs can be changed sequentially. For example, after power is supplied to the U-phase coil 212u and the V-phase coil 212v, power may be supplied to the V-phase coil 212v and the W-phase coil 212w, and subsequently, power may be supplied to the W-phase coil 212w and the U-phase coil 212u. Such sequence may be repeated. Due to the forces created by the changing coil pairs, the first rotor 230 may be rotated.

Figure 10:
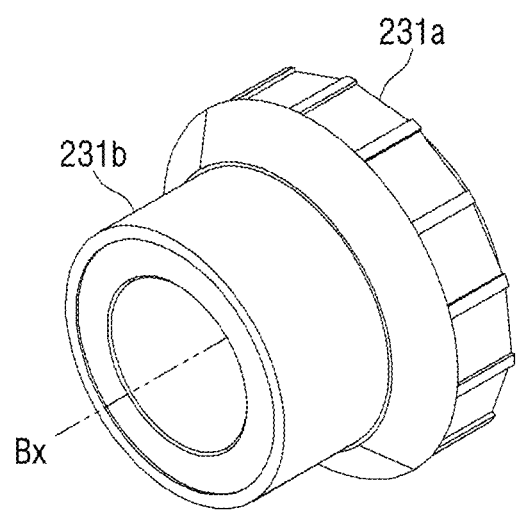
FIG. 10 shows a rotating body of the first rotor according to an exemplary embodiment of the present disclosure.
Figure 11:
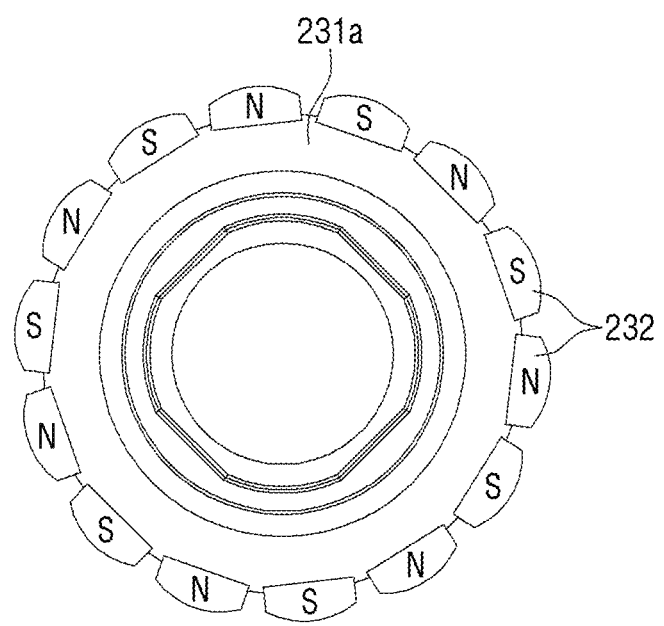
FIGS. 11 and 12 show the first inner permanent magnet or the second inner permanent magnet installed in the rotating body according to an exemplary embodiment of the present disclosure.
Figure 12:
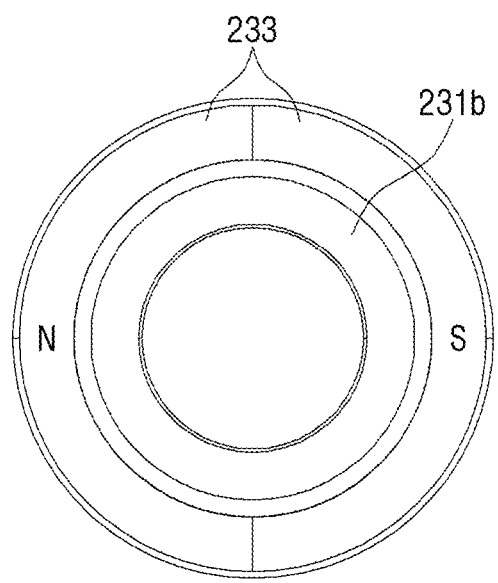

FIG. 10 shows a rotating body of the first rotor, FIGS. 11 and 12 show the first inner permanent magnet and the second inner permanent magnet installed in the rotating body. Referring to FIGS. 10 to 12, the first rotor 230 may include a rotating body 231, a first inner permanent magnet 232, and a second inner permanent magnet 233.

The rotating body 231 may be provided in the form of a cylinder. The rotating body 231 may include a first rotating body 231a and a second rotating body 231b. The first rotating body 231a and the second rotating body 231b may be arranged at different positions along the rotation axis Bx. As will be described later below, the first inner permanent magnet 232 may be coupled to the first rotating body 231a, and the second inner permanent magnet 233 may be coupled to the second rotating body 231b. As the first rotating body 231a and the second rotating body 231b are arranged at different axial positions along the rotation axis Bx, the first inner permanent magnet 232 and the second inner permanent magnet 233 may be arranged on the rotating body 231 at a predetermined spacing along the rotation axis Bx. A diameter of the second rotating body 231b may be smaller than a diameter of the first rotating body 231a with respect to the rotation axis Bx. However, according to some embodiments of the present disclosure, the diameter of the first rotating body 231a may be smaller than or equal to the diameter of the second rotating body 231b.

Referring to FIG. 11, a plurality of first inner permanent magnets 232 may be provided and coupled to the outer surface of the first rotating body 231a in the form of a ring. The plurality of first inner permanent magnets 232 may be arranged on the outer surface of the first rotating body 231a so that different polarities may be disposed adjacent to each other. In other words, the permanent magnet of the S pole may be arranged adjacent to the permanent magnet of the N pole. FIG. 11 shows an example where the first rotor 230 includes 12 first inner permanent magnets 232, but this is illustrative. In some embodiments of the present disclosure, the number of the first inner permanent magnet 232 may be variously determined. Further, the number of the first inner permanent magnets 232 may be different from the number of coils installed in the first stator 210.

Referring to FIG. 12, a plurality of second inner permanent magnets 233 may be provided and coupled to the outer surface of the second rotating body 231b in the form of a ring. The plurality of second inner permanent magnets 233 may be arranged on the outer surface of the second rotating body 231b so that different polarities may be disposed adjacent to each other. In other words, the permanent magnet of the S pole may be arranged adjacent to the permanent magnet of the N pole. FIG. 12 shows an example where the first rotor 230 includes two second inner permanent magnets 233, but this is merely illustrative. In some embodiments of the present disclosure, the number of the second inner permanent magnets 233 may be variously determined. Further, the number of the second inner permanent magnets 233 may be different from the number of the outer permanent magnets 240 installed in the second stator 220.

The first rotor 230 may be rotated based on the magnetic flux transmitted from the first stator 210 to the first inner permanent magnet 232. The magnetic flux of the first stator 210 may generate a force for moving the first inner permanent magnet 232, and the first rotor 230 may be rotated by the force.

Figure 13:
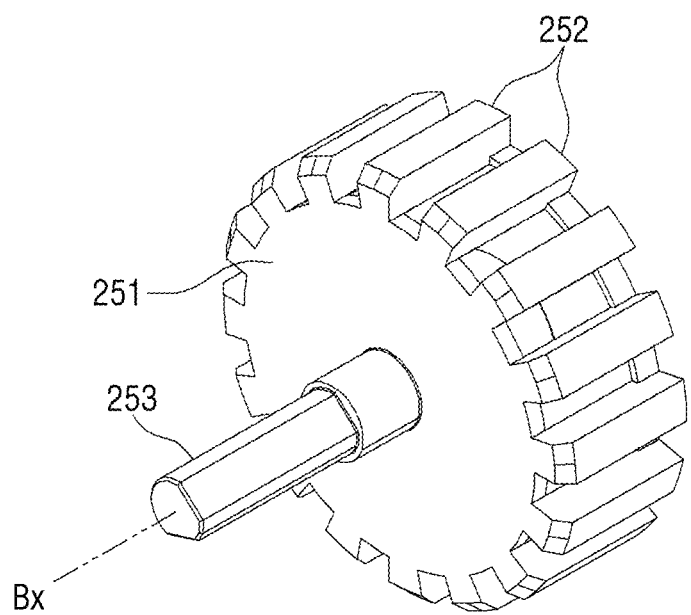
FIG. 13 shows a second rotor according to an exemplary embodiment of the present disclosure.

FIG. 13 shows the second rotor 250. Referring to FIG. 13, the second rotor 250 may include a base 251, one or more pole pieces 252, and a spindle 253.

A planar surface of the base 251 may be formed to be perpendicular to the rotation axis Bx of the second rotor 250. Although FIG. 13 shows that the base 251 is provided in the form of a disk, the shape of the base 251 of the present disclosure is not limited to the disk shape.

A plurality of pole pieces 252 may be provided to extend from the edge of the base 251 in one direction. The plurality of pole pieces 252 may have an elongated shape in a direction parallel to the rotation axis Bx of the second rotor 250. The plurality of pole pieces 252 may be arranged in a ring configuration with respect to the rotation axis Bx of the second rotor 250. Further, adjacent pole pieces 252 among the plurality of pole pieces 252 may be arranged to be spaced apart from each other by a predetermined distance. The spacing distance between adjacent pole pieces 252 may be equally applied to all adjacent pole pieces 252.

A spindle 253 may be coupled to the base 251. Accordingly, when the second rotor 250 rotates, the spindle 253 coupled to the base 251 may rotate together with the second rotor 250. The spindle 253 may output the rotational force of the second rotor 250. As the second rotor 250 rotates, an object coupled to the spindle 253 may be rotated.

Figure 14:
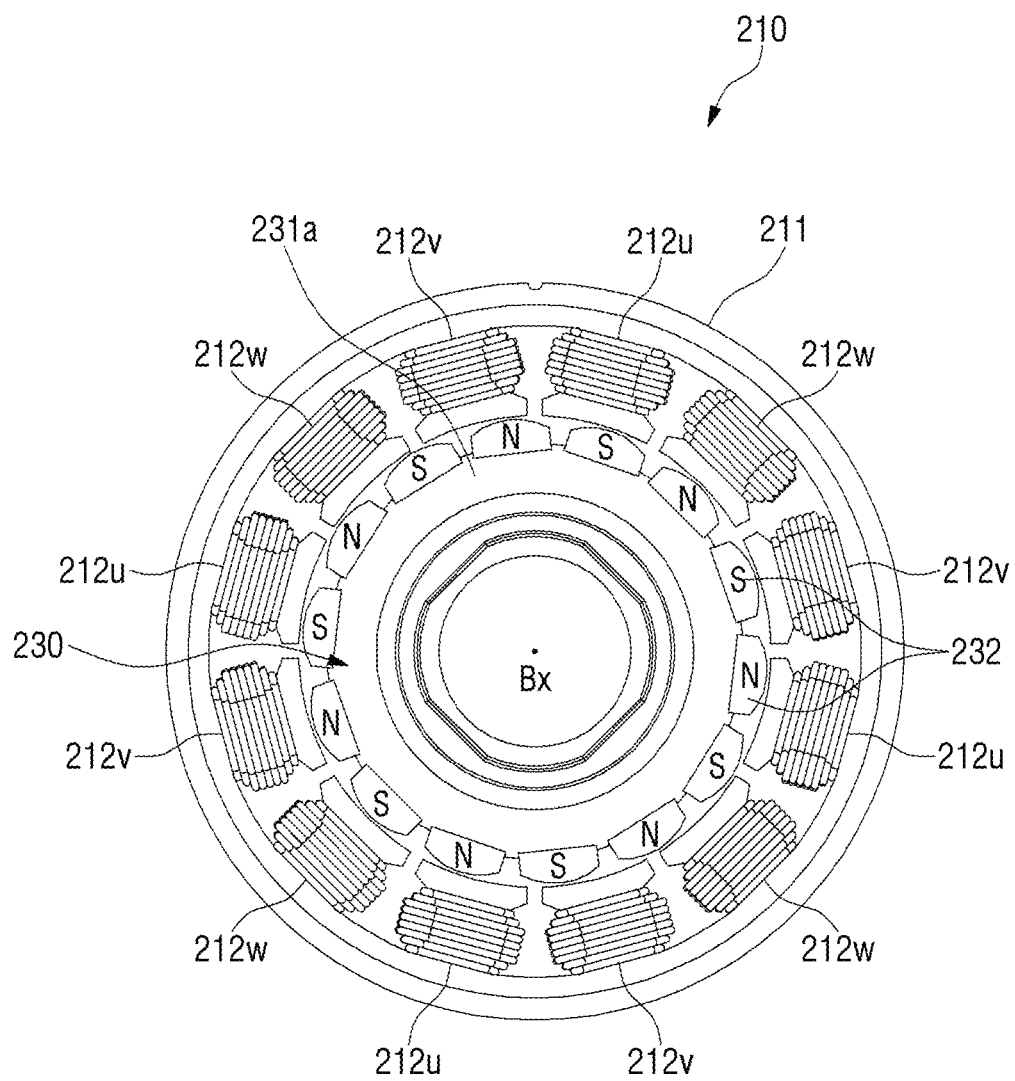
FIG. 14 illustrates rotation operation of the first rotor with respect to the first stator according to an exemplary embodiment of the present disclosure.

FIG. 14 is provided for describing a rotation operation of the first rotor with respect to the first stator. Referring to FIG. 14, the first stator 210 and the first rotor 230 may be arranged with respect to the same rotation axis Bx. The central axis of the rim 211a of the first stator 210 and the central axis of the first rotor 230 may coincide.

The plurality of coils 212u, 212v, and 212w provided in the first stator 210 may generate magnetic flux for each phase. For example, after the U-phase coil 212u generates a magnetic flux, the V-phase coil 212v may generate a magnetic flux, and then the W-phase coil 212w may generate a magnetic flux. When the coils of one phase generate magnetic flux, the magnetic flux of the other coils may be stopped. The magnetic flux generated in each phase coil may be transferred to the first inner permanent magnet 232 of the first rotor 230, and a force may be exerted on the first inner permanent magnet 232.

Alternatively, the coils of the two phases may generate magnetic flux at the same time. For example, the U-phase coil 212u and the V-phase coil 212v may simultaneously generate magnetic flux, or the V-phase coil 212v and the W-phase coil 212w may simultaneously generate magnetic flux, or the W-phase coil 212w and the U-phase coil 212u may simultaneously generate magnetic flux. In this case, one of the two coils generating magnetic flux at the same time may apply an attraction force to the pulling first rotor 230, and the other of the two coils may apply a repulsive force.

The first rotor 230 may rotate with respect to the rotation axis Bx by the force applied to the first inner permanent magnet 232. As the generation of magnetic flux by the coils 212u, 212v, and 212w of each phase of the first stator 210 is circulated, the rotation of the first rotor 230 may be continued.

Figure 15:
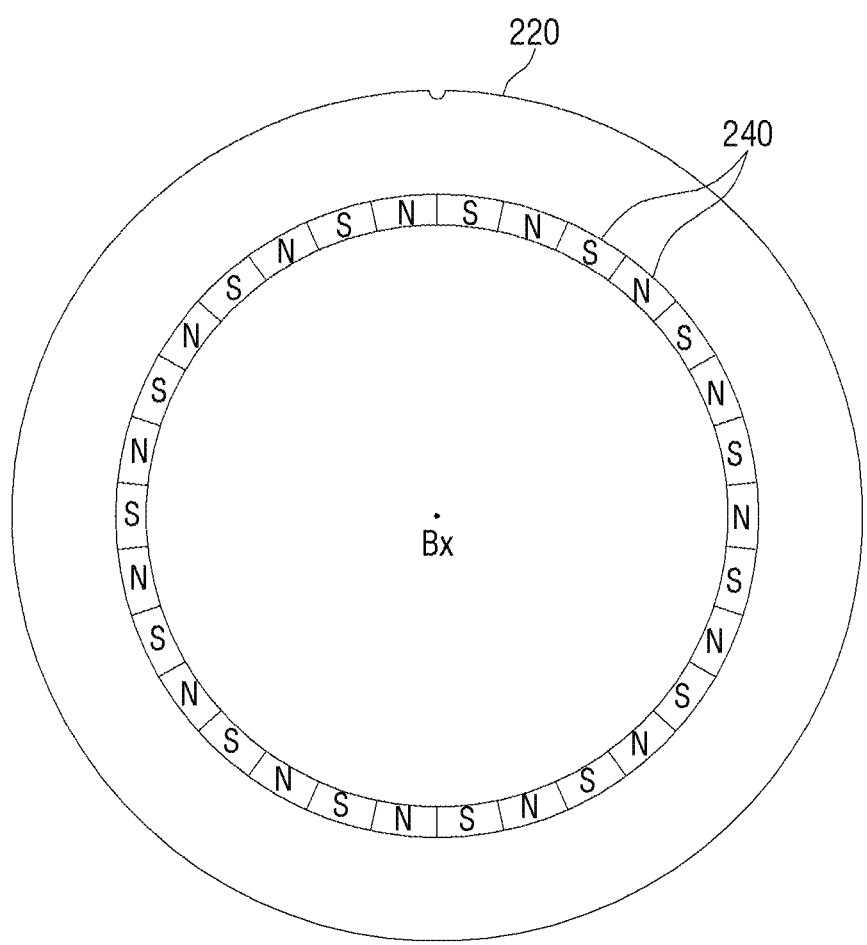
FIG. 15 shows the outer permanent magnet that is coupled to the second stator according to an exemplary embodiment of the present disclosure.

FIG. 15 shows the outer permanent magnet coupled to the second stator. Referring to FIG. 15, the outer permanent magnet 240 may be coupled to the second stator 220 and fixed thereto. The second stator 220 may be provided in a ring shape. For example, the outer diameter of the second stator 220 may be equal or similar to the outer diameter of the first stator 210. The plurality of outer permanent magnets 240 may be arranged in a ring shape along the inner surface of the second stator 220.

The plurality of outer permanent magnets 240 may be arranged so that different polarities are adjacent to each other. In other words, the permanent magnet of the S pole may be arranged adjacent to the permanent magnet of the N pole. Although FIG. 15 shows an example where 30 outer permanent magnets 240 are coupled to the second stator 220, according to some embodiments of the present disclosure, the number of outer permanent magnets 240 may be variously determined. Further, the number of the outer permanent magnets 240 may be different from the number of the second inner permanent magnets 233 installed in the first rotor 230. Specifically, the number of the outer permanent magnets 240 may be set to be greater than the number of the second inner permanent magnets 233 installed in the first rotor 230.

Figure 16:
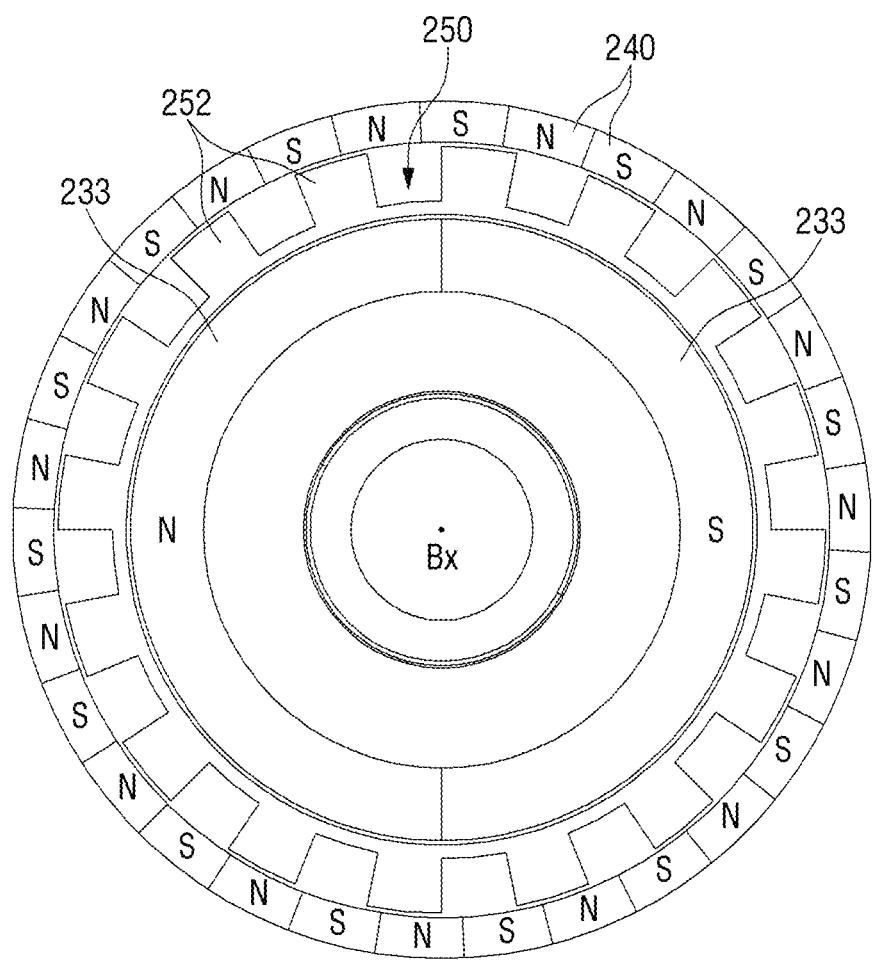
Figure 18:
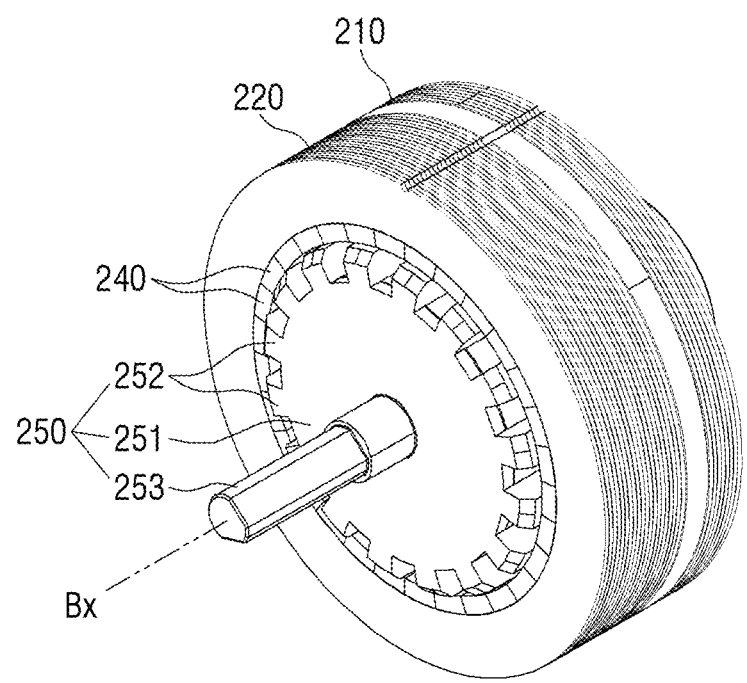

FIGS. 16 to 18 describe a rotation operation of the second rotor. Referring to FIG. 16, the plurality of pole pieces 252 may be arranged between the second inner permanent magnet 233 and the outer permanent magnet 240. The plurality of pole pieces 252 may form a magnetic force path between the second inner permanent magnet 233 and the outer permanent magnet 240. In the present disclosure, the pole pieces 252 may include a magnetic material. For example, the pole pieces 252 of the present disclosure may include a ferromagnetic material or a diamagnetic material. Accordingly, the pole pieces 252 arranged between the second inner permanent magnet 233 and the outer permanent magnet 240 may be simultaneously magnetized by the second inner permanent magnet 233 and the outer permanent magnet 240 to form a magnetic force path between the second inner permanent magnet 233 and the outer permanent magnet 240.

The number of the plurality of pole pieces 252 provided in the second rotor 250 may be different from the number of the second inner permanent magnets 233 and the number of the outer permanent magnets 240. For example, the number of the plurality of pole pieces 252 may be different from the number of the second inner permanent magnets 233 and different from the number of the outer permanent magnets 240.

The direction of the force acting on each pole piece 252 may vary based on the positions of the second inner permanent magnet 233 and the outer permanent magnet 240 present in the vicinity. In particular, a force in the circumferential direction of the second rotor 250 may act on some of the pole pieces 252 among the plurality of pole pieces 252. When the first rotor 230 does not rotate, the resultant force of the forces in the circumferential direction acting on the plurality of pole pieces 252 provided in the second rotor 250 may be zero. In this case, the second rotor 250 may not rotate. Meanwhile, when the first rotor 230 rotates, the resultant force of the forces in the circumferential direction acting on the plurality of pole pieces 252 provided in the second rotor 250 may have a predetermined magnitude. Accordingly, the second rotor 250 may be rotated with respect to the rotation axis Bx by the corresponding force.

The number of revolutions per unit time of the second rotor 250 may be smaller than the number of revolutions per unit time of the first rotor 230. On the other hand, the force applied to the second rotor 250 by the first rotor 230 rotating for a unit time may be accumulated during the corresponding time period, and thus the second rotor 250 may rotate with a higher torque than the first rotor 230. The torque of the second rotor 250 may be determined based on the number of second inner permanent magnets 233, the number of outer permanent magnets 240, and the number of pole pieces 252.

The reduction ratios are presented in the table shown in FIG. 17, which may be determined based on the number of the second inner permanent magnets 233, the outer permanent magnets 240, and the pole pieces 252. Here, the reduction ratio represents the number of revolutions per unit time of the second rotor 250 with respect to the number of revolutions per unit time of the first rotor 230. In the reduction ratio table, $n_s$ indicates the number of pole pieces 252, $p_1$ indicates the number of dipoles of the outer permanent magnet 240, and $p_2$ indicates the number of dipoles of the second inner permanent magnet 233. Here, the dipole represents a pair of N pole and S pole among the plurality of magnets.

As shown in FIG. 17, the reduction ratio may vary depending on which body is fixed and does not rotate, which one serves as an input body that receives the magnetic flux from the coils 212u, 212v, and 212w, and which one serves as an output body that rotates and generates the output rotational force. When the outer permanent magnet 240 is the fixed body, the second inner permanent magnet 233 is the input body, and the pole pieces 252 are the output body, respectively (i.e., the first row of the table), the reduction ratio may be determined as $p_1/p_2+1$. When the pole pieces 252 are the fixed body, the second inner permanent magnet 233 is the input body, and the outer permanent magnet 240 is the output body, respectively (i.e., the second row of the table), the reduction ratio may be determined as $p_1/p_2$. When the second inner permanent magnet 233 is the fixed body, the outer permanent magnet 240 is the input body, and the pole pieces 252 are the output body, respectively (i.e., the third row of the table), the reduction ratio may be determined as $p_2/p_1+1$.

FIG. 17 shows that although the previous description has been provided for a configuration where the outer permanent magnet 240, the second inner permanent magnet 233, and the pole pieces 252 are the fixed body, the input body, and the output body, respectively, the present disclosure is not limited to such a configuration. The pole pieces 252, the second inner permanent magnet 233, and the outer permanent magnet 240 may become the fixed body, the input body, and the output body, respectively, or the second inner permanent magnet 233, the outer permanent magnet 240, and the pole pieces 252 may become the fixed body, the input body, and the output body, respectively.

Referring to FIG. 18, as the second rotor 250 rotates, the rotational force of the second rotor 250 may be output via the spindle 253. The rotational force of the plurality of pole pieces 252 may be directed to the base 251, and the spindle 253 may rotate together with the base 251 with respect to the rotation axis Bx. In some embodiments, the spindle 253 may be coupled to the transmission unit 100 via the driving force transferring unit 400, and accordingly, as the spindle 253 rotates, the transmission unit 100 may be rotated to switch the posture of the transmission unit 100.

The base 251 of the second rotor 250 may cover one surface perpendicular to the rotation axis Bx of the first rotor 230. In the present disclosure, the base 251 may include a weak magnetic material or a non-metal. As such, the magnetic force by the first inner permanent magnet 232 provided in the first rotor 230 may not strongly affect the transmission unit 100.

Figure 19:
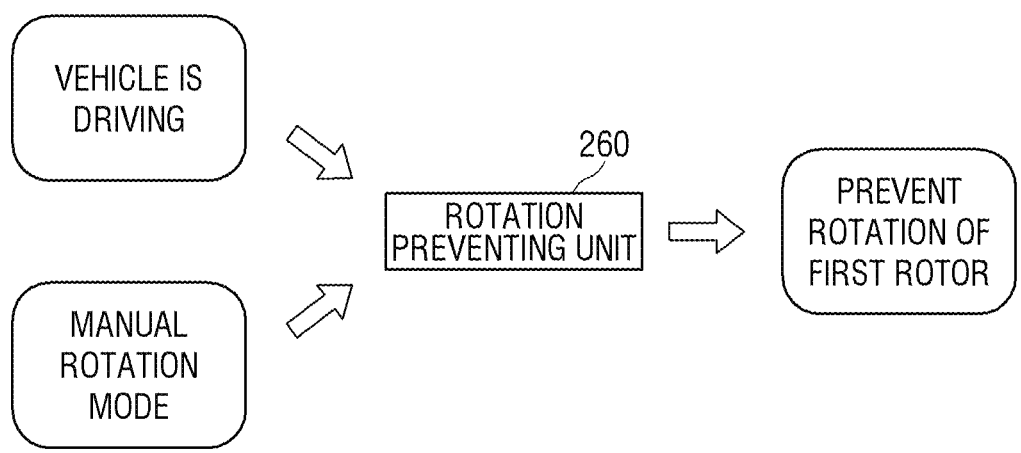
FIG. 19 schematically depicts the operation of the rotation preventing unit according to an exemplary embodiment of the present disclosure.

FIG. 19 schematically depicts the operation of the rotation preventing unit. Referring to FIG. 19, the rotation preventing unit 260 may prevent rotation of the first rotor 230 by applying a physical force to the first rotor 230 when a preset condition is satisfied.

In the present disclosure, the condition for preventing rotation may include, but not be limited to, whether the vehicle is operating or whether the transmission unit 100 is manually operated by the user. When the vehicle is operating (e.g., being driven) or the mode of the transmission unit 100 is a manual operation mode, the rotation preventing unit 260 may be activated to prevent the rotation of the first rotor 230. The control device 300 may be configured to control the operation of the rotation preventing unit 260 with reference to whether the vehicle is operating or whether the transmission unit 100 is manually operated. When the rotation preventing unit 260 prevents rotation of the first rotor 230, the first rotor 230 may be fixed and may be prevented from rotating even if an external force is applied.

As described above, the second rotor 250 may form a magnetic force path between the second inner permanent magnet 233 and the outer permanent magnet 240. The position of each pole piece 252 of the second rotor 250 may be determined based on the positions of the adjacent second inner permanent magnet 233 and the outer permanent magnet 240. As such, when the first rotor 230 rotates, the second rotor 250 may be rotated as well. Meanwhile, when the rotation of the first rotor 230 is stopped, the rotation of the second rotor 250 may also be stopped. Specifically, when the rotation of the first rotor 230 is stopped, the resultant force in the circumferential direction applied to the entire pole piece 252 of the second rotor 250 by the second inner permanent magnet 233 and the outer permanent magnet 240 may become zero.

On the other hand, when the driving unit 200 does not operate normally, it may be necessary to forcibly rotate the transmission unit 100 by the user. For example, when the first stator 210 does not operate normally, rotation of the transmission unit 100 may not be performed, and in this case, the transmission unit 100 may be stowed in the storage device. To avoid such a situation, the user may forcibly rotate the transmission unit 100 to expose the transmission unit 100 from the storage device. When the driving unit 200 does not operate normally, such as when power is not applied to the driving unit 200, the control device 300 may be configured to switch the rotation mode of the transmission unit 100 to the manual rotation mode, and may be configured to control the rotation preventing unit 260 so that the first rotor 230 does not rotate.

The rotation of the transmission unit 100 may be prevented when the vehicle is being driven. Since the transmission unit 100 may be directly or indirectly connected to the second rotor 250, when the rotation of the first rotor 230 is prevented and the second rotor 250 is fixed, the rotation of the transmission unit 100 may be prevented. Therefore, when the vehicle is being driven, the control device 300 may control the rotation preventing unit 260 so that the first rotor 230 does not rotate.

The rotation preventing unit 260 may operate by the supplied power to prevent rotation of the first rotor 230, and may allow rotation of the first rotor 230 when the supply of power is cut off. For example, the rotation preventing unit 260 may include a solenoid. When power is supplied to the rotation preventing unit 260 to operate the solenoid, heat may be generated in the rotation preventing unit 260 as power is supplied to the coils 212u, 212v, and 212w around the solenoid. According to the present disclosure, since power is supplied to the rotation prevention unit 260 only when the rotation preventing condition is satisfied, unnecessary heat generation by the rotation preventing unit 260 may be prevented.

Figure 20:
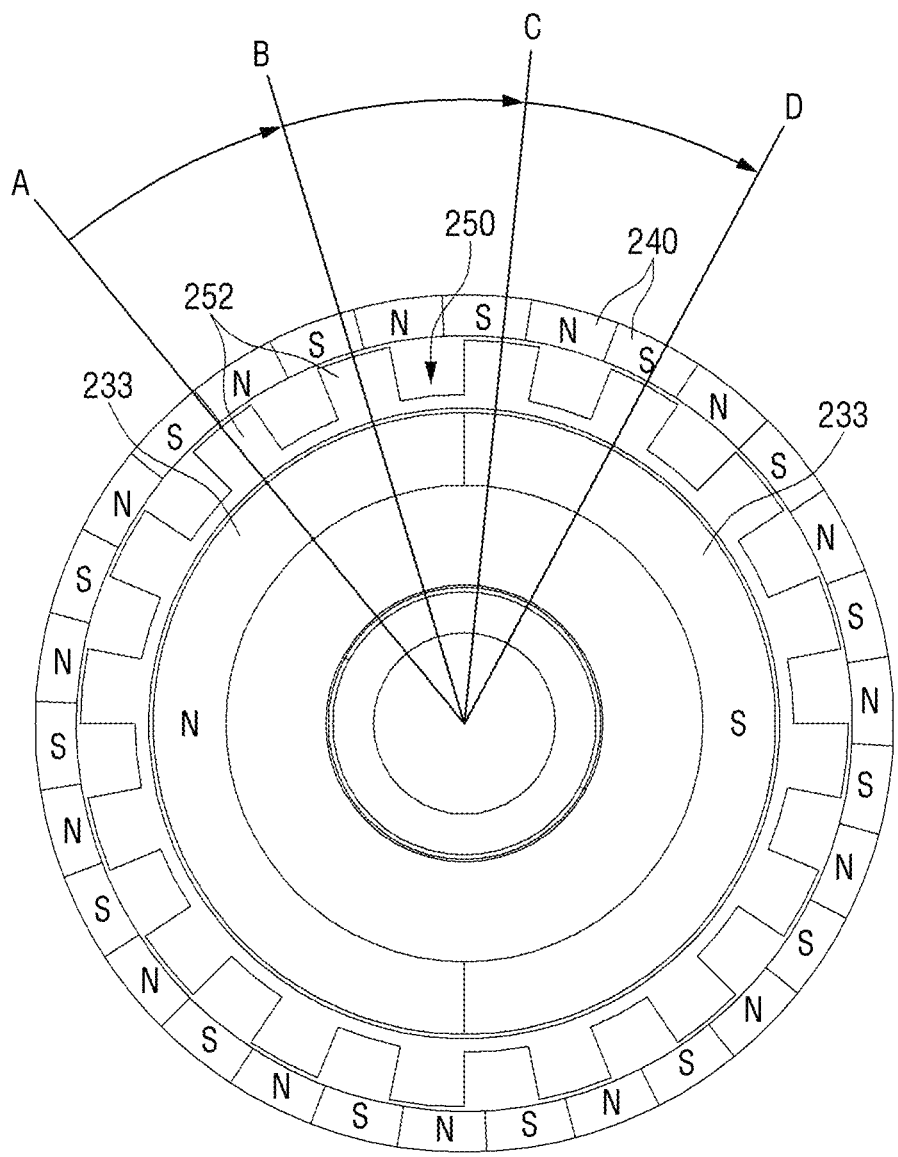
FIG. 20 illustrates a manual rotation operation of the second rotor according to an exemplary embodiment of the present disclosure.

FIG. 20 describes a manual rotation operation of the second rotor. Referring to FIG. 20, when the first rotor 230 is fixed, the second rotor 250 may rotate in a stepwise manner.

When the rotation of the first rotor 230 is stopped, the rotation of the second rotor 250 may be held by the magnetic force of the second inner permanent magnet 233 and the outer permanent magnet 240. However, when a force greater than the magnetic force between the second inner permanent magnet 233 and the outer permanent magnet 240 is applied on the second rotor 250, the second rotor 250 may be rotated in a stepwise manner. In this case, the second rotor 250 may perform the stepwise rotation that is articulated by a distance between the adjacent pole pieces 252. For example, when the number of the pole pieces 252 is 16, the second rotor 250 may perform the stepwise rotation with an articulation of 360/16=22.5 degrees. As the second rotor 250 rotates in the stepwise manner, the transmission unit 100 may generate a sense of operation (e.g., haptic feedback, or tactile feedback).

Referring to FIG. 20, when a force greater than the magnetic force between the second inner permanent magnet 233 and the outer permanent magnet 240 is exerted on the second rotor 250 that is fixed at position A, the second rotor 250 may rotate to position B. Likewise, the second rotor 250 fixed at position B may rotate to position C and then to position D.

At each fixed position, the second rotor 250 may be retained by the second inner permanent magnet 233 and the outer permanent magnet 240. The force of the second inner permanent magnet 233 and the outer permanent magnet 240 for holding the second rotor 250 may be strongest in the fixed position, and may become weaker in other positions. For example, the force of the second inner permanent magnet 233 and the outer permanent magnet 240 for holding the rotation of the second rotor 250 may increase as each pole piece 252 approaches the fixed position. Since the force of the second inner permanent magnet 233 and the outer permanent magnet 240 acting on the second rotor 250 are different between the fixed position and the non-fixed position, it is possible for the second rotor 250 to rotate in the stepwise manner with the articulation corresponding to a distance between adjacent pole pieces 252.

Since the second rotor 250 may be connected to the transmission unit 100, when the user rotates the transmission unit 100 in the manual rotation mode, the transmission unit 100 may also perform the stepwise rotation together with the second rotor 250. In addition, when the rotation of the transmission unit 100 by the user is stopped, the second rotor 250 may be held by the second inner permanent magnet 233 and the outer permanent magnet 240, and thus, the transmission unit 100 may also be fixed.

Due to this configuration, when the forced rotation of the transmission unit 100 is performed by the user, the stepwise rotation of the second rotor 250 may be performed as described above. In other words, when the transmission unit 100 is manually rotated by the user, the driving unit 200 may provide a tactile sense of operation. Accordingly, the user may rotate the transmission unit 100 while sensing the intermittent forces.

FIG. 20 shows a rotation pattern when the pole pieces 252 (therefore, the second rotor 250) is an output body. When the outer permanent magnet 240 (therefore, the second stator 220) is the output body, the output body may perform the stepwise rotation with an articulation distance between adjacent outer permanent magnets 240.

Hereinabove, description has been provided for an example where the transmission unit 100 and the driving unit 200 are coupled via the driving force transferring unit 400 implemented in the form of a belt. However, according to another embodiment of the present disclosure, the transmission unit 100 and the driving unit 200 may be coupled via the driving force transferring unit 600 provided with a wire (see FIG. 21), or may be directly coupled without a separate driving force transferring unit.

Figure 21:
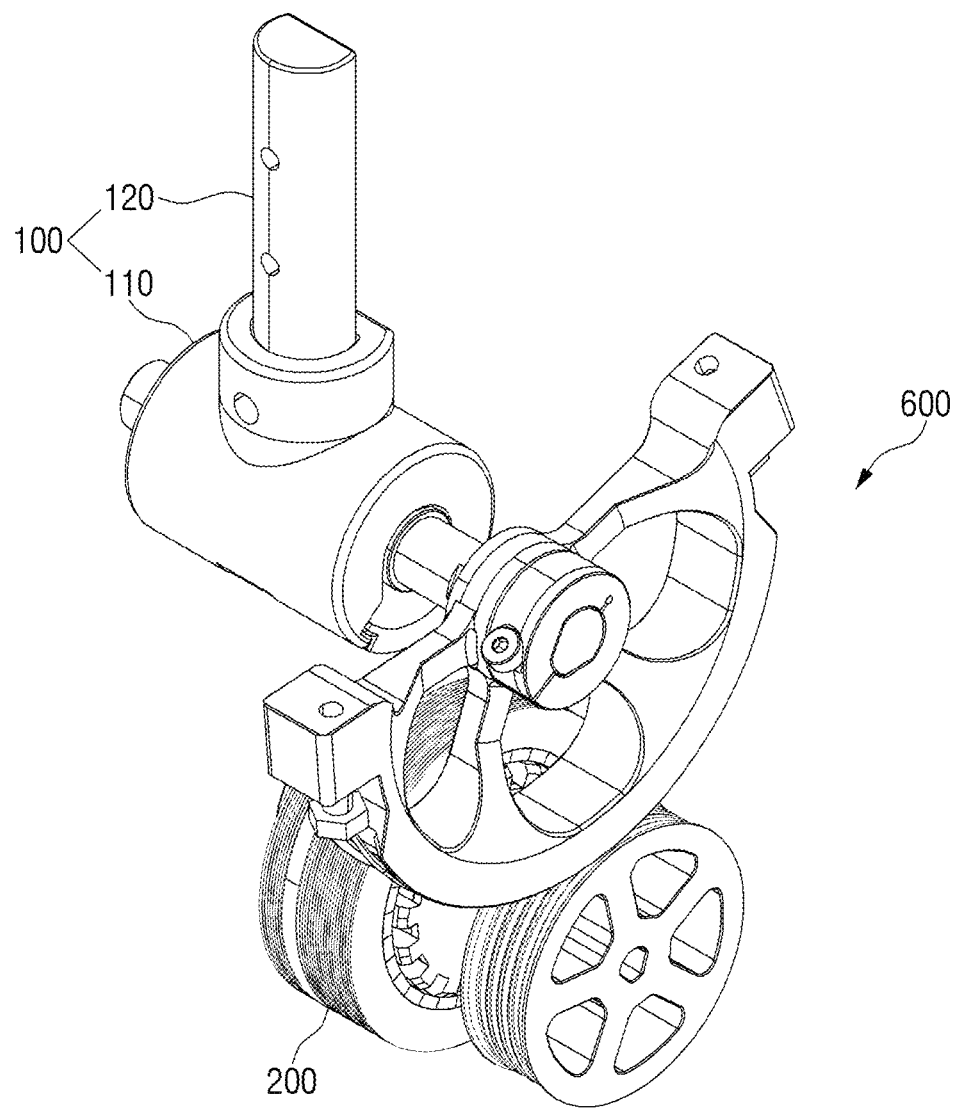
FIG. 21 shows the transmission unit and the driving unit that are coupled by a driving force transferring unit provided with a wire according to an exemplary embodiment of the present disclosure.
Figure 22:
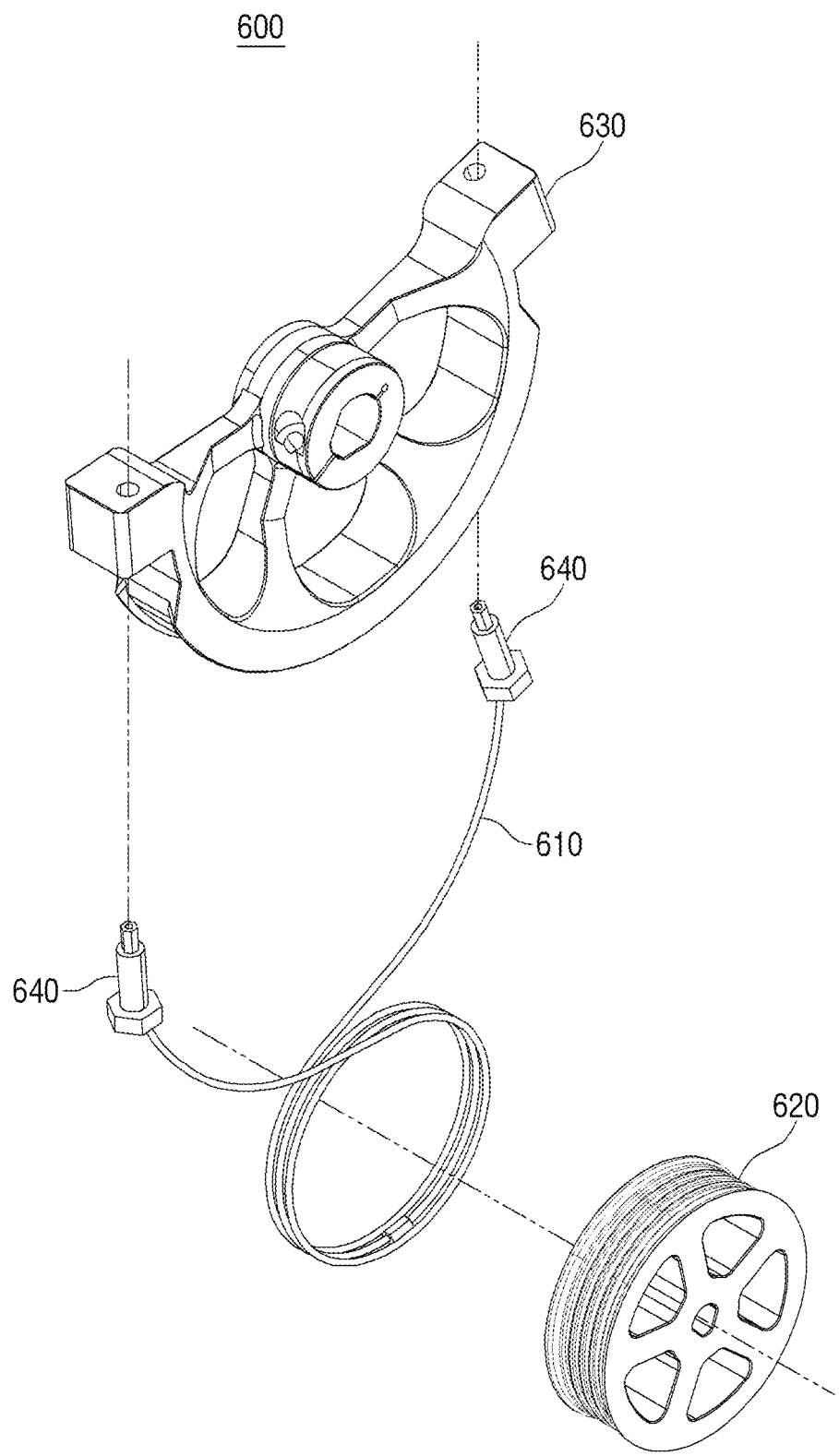
FIG. 22 is an exploded perspective view of the driving force transferring unit shown in FIG. 21.
Figure 23:
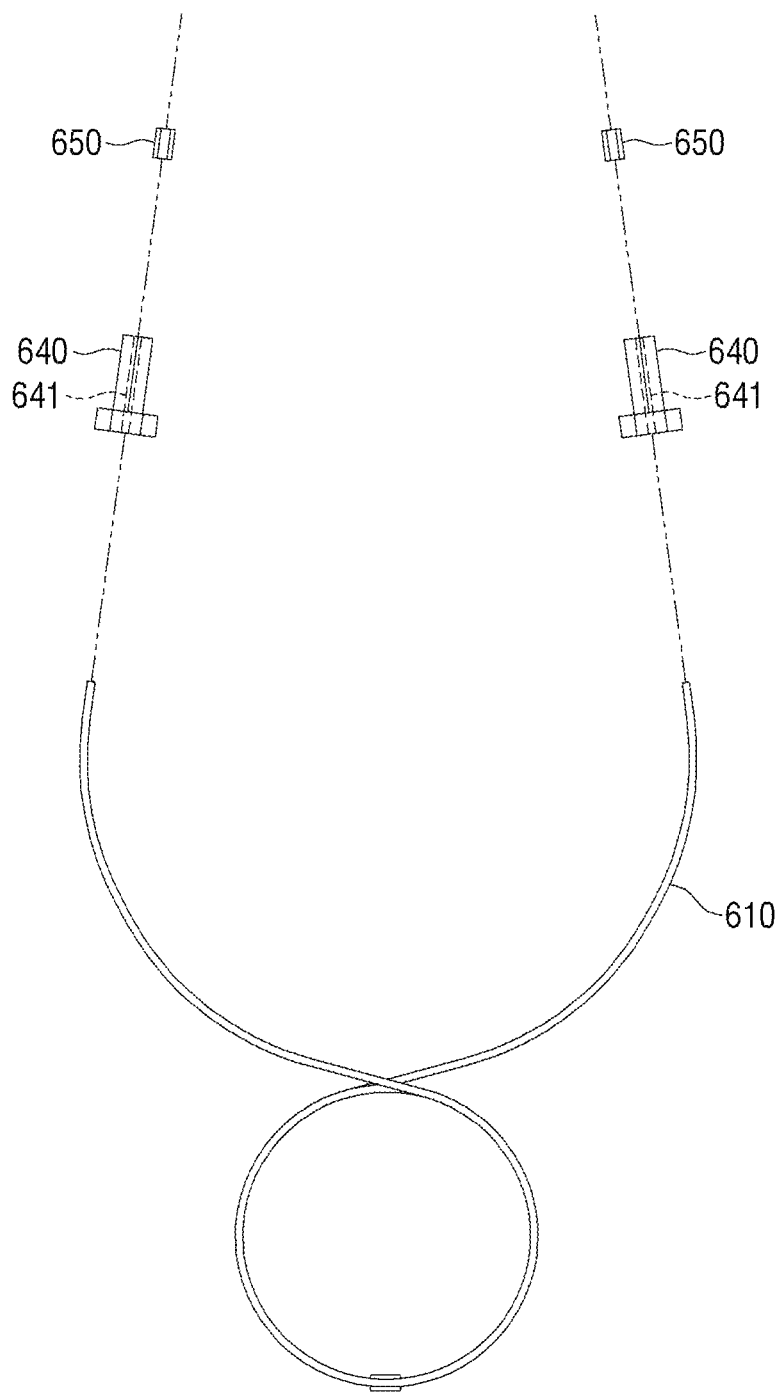
FIG. 23 illustrates the coupling relationship between the wire and the wire fixing unit according to an exemplary embodiment of the present disclosure.
Figure 24:
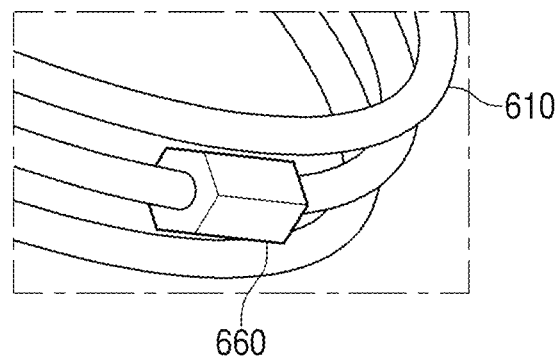
FIG. 24 shows the slip preventing pin that is coupled to the wire according to an exemplary embodiment of the present disclosure.
Figure 25:
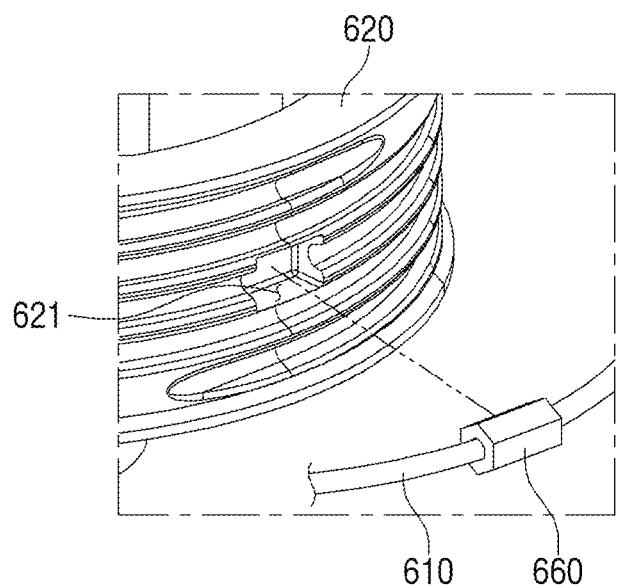
FIG. 25 shows the coupling relationship between the driving pulley and the slip preventing pin according to an exemplary embodiment of the present disclosure.
Figure 26:
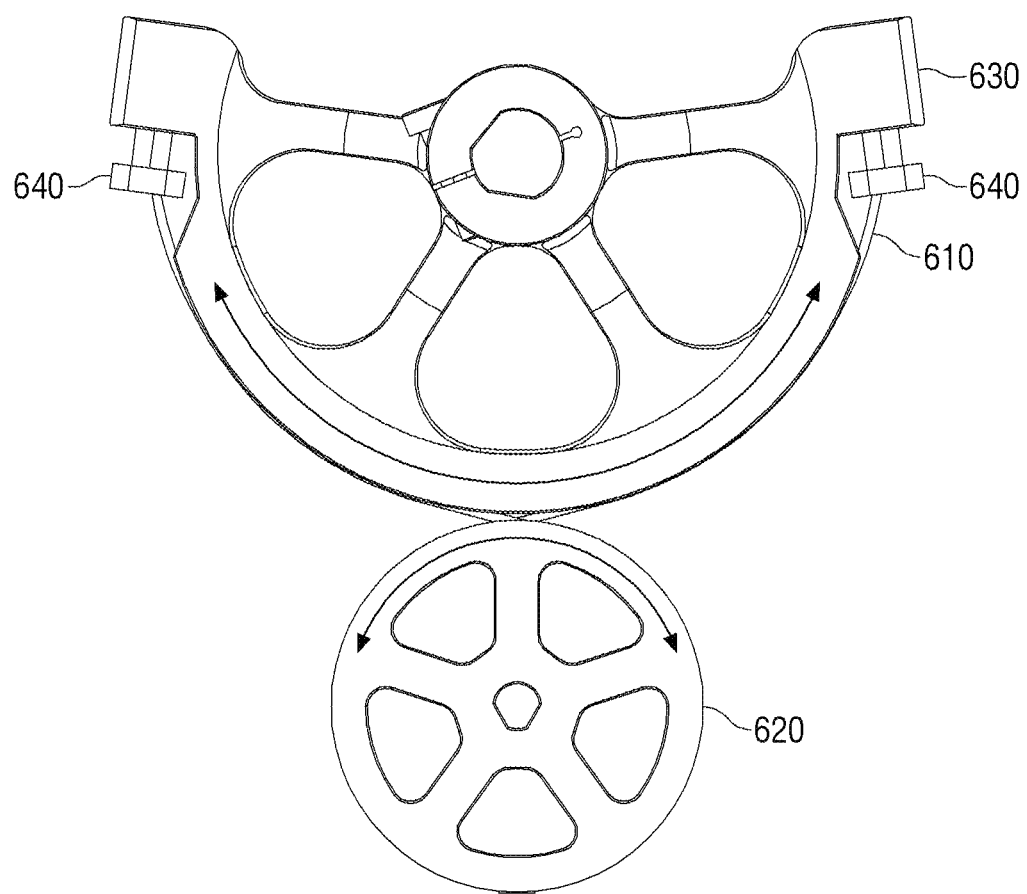
FIG. 26 depicts that force is exchanged between the driving pulley and the driven pulley in an exemplary embodiment of the present disclosure.
Figure 27:
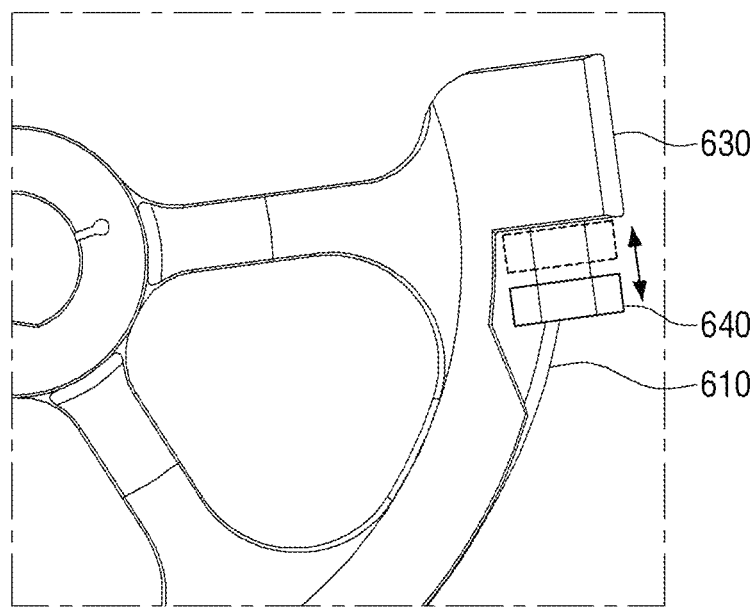
FIG. 27 depicts that the tension of the wire is adjusted by the wire fixing unit according to an exemplary embodiment of the present disclosure.

FIG. 21 shows the transmission unit and the driving unit are coupled by a driving force transferring unit provided with a wire, FIG. 22 is an exploded perspective view of the driving force transferring unit shown in FIG. 21, and FIG. 23 is a view for describing a coupling relationship between the wire and the wire fixing unit. FIG. 24 shows the slip preventing pin that is coupled to the wire, FIG. 25 shows the coupling relationship between the driving pulley and the slip preventing pin, FIG. 26 shows that force is exchanged between the driving pulley and the driven pulley, and FIG. 27 shows that the tension of the wire is adjusted by the wire fixing unit.

Referring to FIG. 21, the transmission unit 100 and the driving unit 200 may be coupled via the driving force transferring unit 600. The driving force transferring unit 600 may transfer the force (or the torque) between the transmission unit 100 and the driving unit 200. For example, the driving force transferring unit 600 may transfer the driving force of the driving unit 200 to the transmission unit 100, or may transfer a rotational force due to the position change of the transmission unit 100 to the driving unit 200.

Referring to FIG. 22, the driving force transferring unit 600 may include a wire 610, a driving pulley 620, a driven pulley 630, and a wire fixing unit 640. The wire 610 may transfer the force between the driving pulley 620 and the driven pulley 630. The rotational force of the driving pulley 620 may be transferred to the driven pulley 630 via the wire 610, and vice versa, i.e., the rotational force of the driven pulley 630 may be transferred to the driving pulley 620 via the wire 610.

The driving pulley 620 may be rotated by the driving force of the driving unit 200. For example, the driving pulley 620 may be coupled to the spindle 253 of the driving unit 200 and rotated by the driving force of the driving unit 200. In addition, the driving pulley 620 may rotate the spindle 253 of the driving unit 200 with the rotational force transferred from the driven pulley 630.

The wire 610 may be wound around the driving pulley 620. In some embodiments, as shown in FIG. 22, the wire 610 may be wound around the driving pulley 620 by one or more rotations. To prevent the wire 610 from moving on the surface of the driving pulley 620, one or more grooves may be formed on the circumferential surface of the driving pulley 620.

The driven pulley 630 may be rotated by switching the posture of the transmission unit 100. For example, the driven pulley 630 may be coupled to the transmission body 110 of the transmission unit 100 and may be rotated by the rotational force from the transmission unit 100. In addition, the driven pulley 630 may rotate the transmission unit 100 with the rotational force transferred from the driving pulley 620. The driven pulley 630 may exchange rotational force with the driving pulley 620 via the wire 610. To this end, a portion of the wire 610 that is not wound on the driving pulley 620 may be coupled to the driven pulley 630. For example, both ends of the wire 610 may be coupled to the driven pulley 630.

Referring to FIGS. 22 and 23, the wire fixing unit 640 may couple the wire 610 to the driven pulley 630. The wire fixing unit 640 may include a hollow lumen 641, through which the wire 610 may pass. A wire fixing pin 650 to be fixedly coupled to the wire 610 may be provided at an end of the wire 610 that passes through the hollow lumen 641. The wire fixing unit 640 may be coupled to the driven pulley 630 while pressing the wire fixing pin 650. The outer diameter of the wire fixing pin 650 may be greater than the inner diameter of the hollow lumen 641 provided in the wire fixing unit 640. Accordingly, since the wire fixing pin 650 is not allowed to pass through the hollow lumen 641 of the wire fixing unit 640 once it is fixed to the wire 610, when the wire fixing unit 640 is coupled to the driven pulley 630, the end of the wire 610 may be fixed to the driven pulley 630 by the wire fixing pin 650.

Referring to FIG. 24, a portion of the wire 610 wound around the driving pulley 620 may include a slip preventing pin 660 fixedly coupled to the wire 610. The slip preventing pin 660 may be fixed to the wire 610, by for example, welding. Referring to FIG. 25, the driving pulley 620 may include a receiving groove 621 configured to accommodate the slip preventing pin 660 therein.

In a state coupled to the wire 610, the slip preventing pin 660 may be accommodated in the receiving groove 621 of the driving pulley 620, and accordingly, the slip preventing pin 660 may be prevented from moving along the winding direction of the wire 610 while being accommodated in the receiving groove 621. Due to the slip preventing pin 660, the wire 610 may be prevented from sliding on the surface of the driving pulley 620. Accordingly, transfer of the rotational forces between the driving pulley 620 and the driven pulley 630 may be more reliably performed via the wire 610.

Referring to FIG. 26, the driving pulley 620 and the driven pulley 630 may exchange the rotational force via the wire 610. When the driving pulley 620 is rotated by the driving force of the driving unit 200, the driven pulley 630 may be rotated accordingly, and when the driven pulley 630 rotates by the position change of the transmission unit 100, the driving pulley 620 may be rotated corresponding thereto.

The wire 610 may transfer a rotational force between the driving pulley 620 and the driven pulley 630 while maintaining an appropriate tension. With an appropriate tension, the rotational force may be transferred by the wire 610 with no or minimal time delay between the driving pulley 620 and the driven pulley 630. In other words, the driven pulley 630 may be rotated simultaneously by the rotation of the driving pulley 620, and the driving pulley 620 may be rotated simultaneously by the rotation of the driven pulley 630. In addition, due to the use of the wire 610, the rotational force may be transferred with less noise, and there is also an advantage of reduced wear of the parts.

On the other hand, when the tension of the wire 610 is not appropriately set, the rotational force transfer between the driving pulley 620 and the driven pulley 630 may be inhibited. For example, when the tension of the wire 610 is insufficient, a delay may occur in transferring the rotational force, and when the tension of the wire 610 is excessive, the transfer efficiency of the rotational force may be reduced.

Referring to FIG. 27, therefore, the tension of the wire 610 may be adjusted based on the coupling depth of the wire fixing unit 640 with respect to the driven pulley 630. In the present disclosure, the coupling depth of the wire fixing unit 640 with respect to the driven pulley 630 may be arbitrarily determined. For example, the wire fixing unit 640 may be implemented in the form of a bolt, and correspondingly, the driven pulley 630 may include a threaded coupling hole. The wire fixing unit 640 may be screw-coupled to the coupling hole of the driven pulley 630. In such embodiments, the coupling depth of the wire fixing unit 640 with respect to the driven pulley 630 may be varied based on the number of rotations of the wire fixing unit 640. As the coupling depth of the wire fixing unit 640 to the driven pulley 630 increases, the tension of the wire 610 may be increased, and as the coupling depth of the wire fixing unit 640 to the driven pulley 630 decreases, the tension of the wire 610 may be decreased. The tension of the wire 610 may be adjusted by determining the coupling depth of the wire fixing unit 640 to the driven pulley 630 appropriately while manufacturing the driving force transferring unit 600.

Figure 28:
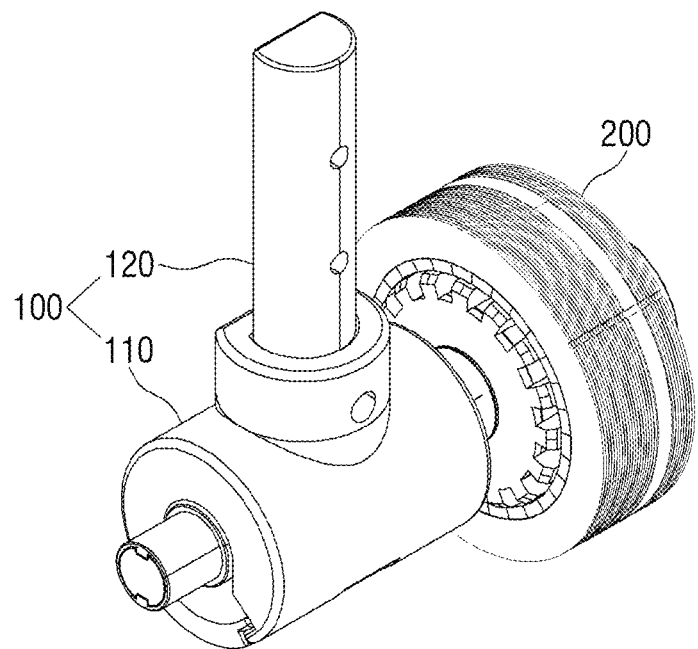
FIG. 28 shows the transmission unit and the driving unit that are directly coupled according to an exemplary embodiment of the present disclosure.

In some embodiments, referring to FIG. 28, the transmission unit 100 and the driving unit 200 may be directly coupled. For example, the transmission body 110 of the transmission unit 100 and the spindle 253 of the driving unit 200 may be directly coupled. In this case, the transmission unit 100 may be rotated by the driving force of the driving unit 200, or the spindle 253 of the driving unit 200 may be rotated by the position change of the transmission unit 100.

As the transmission unit 100 and the driving unit 200 are directly coupled, the transfer of rotational force between the transmission unit 100 and the driving unit 200 may be performed in real time. In addition, since no separate part for transferring the rotational force is necessary, space utilization may be improved and manufacturing cost may be reduced.

Although the exemplary embodiments of the present disclosure have been described with reference to the above and the accompanying drawings, those of ordinary skill in the art, to which the present disclosure pertains, can understand that the present disclosure may be implemented in other specific forms without changing the technical spirit or essential features. Therefore, it should be understood that the exemplary embodiments described above are illustrative and non-limiting in any respects.

What is claimed is:

1. A transmission for a vehicle, comprising:
a transmission unit for receiving a transmission command for a vehicle;
a driving unit for generating a driving force for switching a posture of the transmission unit; and
a controller configured to cause the driving unit to switch the posture of the transmission unit based on whether a preset condition is satisfied,
wherein the driving unit comprises:
a first stator for generating magnetic flux;
a first rotor including a first inner permanent magnet and a second inner permanent magnet, wherein the first inner permanent magnet and the second inner permanent magnet are disposed axially with a predetermined axial spacing therebetween along a rotation axis, the first rotor being configured to be rotated by the magnetic flux transferred to the first inner permanent magnet;
an outer permanent magnet provided in a number different from a number of the second inner permanent magnet; and
a second rotor configured to rotate along a magnetic force path between the second inner permanent magnet and the outer permanent magnet at a number of revolutions per unit time that is different from a number of revolutions per unit time of the first rotor.

2. The transmission of claim 1, wherein the controller is configured to control the driving unit to cause the transmission unit to be switched to a parking position in response to a parking condition being satisfied.

3. The transmission of claim 1, wherein the control device controller is configured to control the driving unit to cause the transmission unit to be switched to a stow position in response to a stow condition being satisfied.

4. The transmission of claim 1, wherein, in response to the transmission unit being switched from a position corresponding to a first transmission stage to a position corresponding to a second transmission stage while a transmission condition is not satisfied, the controller is configured to control the driving unit to cause the transmission unit to be switched to the position corresponding to the first transmission stage.

5. The transmission of claim 1, wherein the second rotor comprises:
a base; and
a plurality of pole pieces, each of which extends in one direction from an edge of the base.

6. The transmission of claim 5, wherein the plurality of pole pieces are arranged between the second inner permanent magnet and the outer permanent magnet, and form the magnetic force path between the second inner permanent magnet and the outer permanent magnet.

7. The transmission of claim 1, wherein the second rotor rotates in a stepwise manner in response to a force greater than a magnetic force between the second inner permanent magnet and the outer permanent magnet being exerted on the second rotor.

8. The transmission of claim 7, wherein the second rotor rotates in the stepwise manner with an articulation having a distance between adjacent pole pieces or a distance between adjacent outer permanent magnets.

9. The transmission of claim 1, wherein the second rotor rotates in a stepwise manner to generate a sense of operation in the transmission unit in response to a force greater than a magnetic force between the second inner permanent magnet and the outer permanent magnet being exerted on the second rotor.

10. The transmission of claim 1, wherein the transmission unit and the driving unit exchange forces with each other via a driving force transferring unit.

11. The transmission of claim 10, wherein the driving force transferring unit includes a belt.

12. The transmission of claim 10, wherein the driving force transferring unit comprises:
a wire;
a driving pulley rotatable by a driving force of the driving unit, wherein the wire is wound around an outer circumferential surface of the driving pulley; and
a driven pulley rotatable by switching the posture of the transmission unit,
wherein a rotational force is exchanged between the driving pulley and the driven pulley via the wire.

13. The transmission of claim 12, wherein the driving force transferring unit further comprises a wire fixing unit for fixing the wire to the driven pulley, and
wherein a tension of the wire is adjustable depending on a coupling depth of the wire fixing unit into the driven pulley.

14. The transmission of claim 13, wherein the wire fixing unit comprises a hollow lumen, through which the wire passes,
wherein a wire fixing pin is fixedly coupled to the wire at an end of the wire that passes through the hollow lumen, and
wherein the wire fixing unit is coupled to the driven pulley while pressing the wire fixing pin.

15. The transmission of claim 12, wherein a portion of the wire wound on the driving pulley includes a slip preventing pin fixedly coupled to the wire, and
wherein the driving pulley includes a receiving groove for accommodating the slip preventing pin therein.

16. The transmission of claim 1, wherein the transmission unit and the driving unit are directly coupled to each other to exchange power.

17. The transmission of claim 16, wherein the transmission unit is directly coupled to a spindle of the driving unit.

18. A transmission for a vehicle, comprising:
a transmission unit for receiving a transmission command for a vehicle; and
a driving unit for generating a driving force for switching a posture of the transmission unit based on whether a preset condition is satisfied,
wherein the driving unit comprises:
a first stator for generating magnetic flux;
a first rotor including a first inner permanent magnet and a second inner permanent magnet axially arranged with a predetermined axial spacing therebetween along a rotation axis, and configured to be rotated by the magnetic flux transferred to the first inner permanent magnet;
an outer permanent magnet provided in a number different from a number of the second inner permanent magnet; and
a second rotor configured to rotate along a magnetic force path between the second inner permanent magnet and the outer permanent magnet at a number of revolutions per unit time that is different from a number of revolutions per unit time of the first rotor, wherein the driving force transferring unit comprises:

a wire;

a driving pulley rotatable by a driving force of the driving unit, wherein the wire is wound around an outer circumferential surface of the driving pulley; and a driven pulley rotatable by switching the posture of the transmission unit, and wherein a rotational force is exchanged between the driving pulley and the driven pulley via the wire.

19. The transmission of claim 18, wherein the driving force transferring unit further comprises a wire fixing unit for fixing the wire to the driven pulley, wherein a tension of the wire is adjustable depending on a coupling depth of the wire fixing unit into the driven pulley, wherein the wire fixing unit comprises a hollow lumen, through which the wire passes, wherein a wire fixing pin is fixedly coupled to the wire at an end of the wire that passes through the hollow lumen, and wherein the wire fixing unit is coupled to the driven pulley while pressing the wire fixing pin.

20. The transmission of claim 18, wherein a portion of the wire wound on the driving pulley includes a slip preventing pin fixedly coupled to the wire, and wherein the driving pulley includes a receiving groove for accommodating the slip preventing pin therein.

* * * * *